(12) United States Patent

Bidgoli

(10) Patent No.: US 12,640,909 B2

(45) Date of Patent: May 26, 2026

(54) KEY DISTRIBUTION OVER IP/UDP

(71) Applicant: Nokia Solutions and Networks Oy, Espoo (FI)

(72) Inventor: Hooman Bidgoli, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 552 days.

(21) Appl. No.: 18/188,909

(22) Filed: Mar. 23, 2023

(65) Prior Publication Data

US 2024/0322999 A1     Sep. 26, 2024

(51) Int. Cl.
H04L 29/06     (2006.01)
H04L 9/08      (2006.01)
H04L 9/32      (2006.01)

(52) U.S. Cl.
CPC .......... H04L 9/0822 (2013.01); H04L 9/0825 (2013.01); H04L 9/3242 (2013.01)

(58) Field of Classification Search
CPC ... H04L 9/0822; H04L 9/0825; H04L 9/3242; H04L 63/162; H04L 9/0828; H04L 63/061
See application file for complete search history.

(56) References Cited

U.S. PATENT DOCUMENTS

| 8,707,020 | B1 * | 4/2014 | Lengyel .............. H04L 63/0428 |
| | | | 370/252 |
| 10,212,138 | B1 | 2/2019 | Diamant et al. |

| 10,491,659 | B1 | 11/2019 | Powell, III |
| 10,826,876 | B1 | 11/2020 | Sinn et al. |
| 2008/0126559 | A1 | 5/2008 | Elzur et al. |
| 2014/0330982 | A1 | 11/2014 | Jalan et al. |
| 2017/0104851 | A1 | 4/2017 | Arangasamy et al. |
| 2018/0302269 | A1 * | 10/2018 | Sankaran .............. H04L 63/162 |
| 2019/0173860 | A1 | 6/2019 | Sankaran et al. |

(Continued)

FOREIGN PATENT DOCUMENTS

JP     2013102352 A     5/2013

OTHER PUBLICATIONS

Office Action in corresponding Japanese Application No. 2024-042970; dated Apr. 1, 2025 (6 pages) Machine Translation.

(Continued)

*Primary Examiner* — Yogesh Paliwal
(74) *Attorney, Agent, or Firm* — Mendelsohn Dunleavy, P.C.; Steve Mendelsohn

(57)     ABSTRACT

Technique for distributing encryption keys for Layer 2.5/3 transport using MKA (MACsec (Media Access Control Security) Key Agreement). A transmitting (TX) node generates an MKA packet having a Layer 2 header, an IP header, a UDP header, an IEEE 802.1x header, and an MKA payload containing the encryption key for encrypting a packet flow transmitted from the TX node to a receiving (RX) node. The IEEE 802.1x header includes a Security Channel Identification (SCI) that uniquely identifies the packet flow and the encrypting TX node. The TX node transmits the MKA packet to the RX node via a Layer 3 transport. The RX node receives the MKA packet and obtains the encryption key from the MKA packet. The TX node uses the encryption key to encrypt Layer 2.5/3 transport to the RX node, which uses the encryption key to decrypt the encrypted Layer 2.5/3 transport received from the TX node.

19 Claims, 11 Drawing Sheets

| 702 | 704 | 706 | 708 | 710 |
|---|---|---|---|---|
| LAYER 2 HEADER | IP HEADER | UDP HEADER | 802.1x HEADER | MKA PAYLOAD |

700

(56)                  References Cited

U.S. PATENT DOCUMENTS

| 2020/0106702 | A1 |      | 4/2020 | Acharya et al. |            |
|--------------|----|------|--------|----------------|------------|
| 2021/0075829 | A1 |      | 3/2021 | Wei            |            |
| 2023/0133729 | A1 |      | 5/2023 | Bidgoli et al. |            |
| 2023/0370369 | A1 | *    | 11/2023| Saad ........................ | H04L 45/66 |

OTHER PUBLICATIONS

Extended European Search Report for corresponding European application No. 24156066.3; dated Jul. 2, 2024 (11 pages).

IEEE Standards Association, "IEEE Standard 802.1X-2020, Local and Metropolitan Area Networks—Port-Based Network Access Control." Feb. 28, 2020, 289 pages.

IEEE Standards Association, "IEEE Standard 802.1AE-2018, Local and metropolitan area networks—Media Access Control (MAC) Security," Sep. 27, 2018, 239 pages.

IEEE Standards Association, "IEEE Standard 802.1X-2010, Local and metropolitan area networks—Port-Based Network Access Control," Feb. 2, 2010, 222 pages.

Dubroca, Sabrina. "MACsec: a different solution to encrypt traffic", Red Hat Developer, Oct. 2016 (available at https://developers.redhat.com/blog/2016/10/14/macsec-a-different-solution-to-encrypt-network-traffic#) (Year: 2016).

Techopedia, "What Does Layer 3 Mean?", Apr. 2014 (available at https://www.techopedia.com/definition/14825/layer-3) (Year: 2014).

ForcePoint, "What is Multiprotocol Label Switching (MPLS)?", (available at https://www.forcepoint.com/cyber-edu/mpls-multiprotocol-label-switching#) (Year: 2022).

Wikipedia, "IP header", (available at https://en.wikipedia.org/wiki/IP_header) (Year: 2021).

Wikipedia, "List of network protocols (OSI model)", (available at https://en.wikipedia.org/wiki/List_of_network_protocols_(OSI_model)) (Year: 2022).

* cited by examiner

PACKET
300-A

Figure 5:
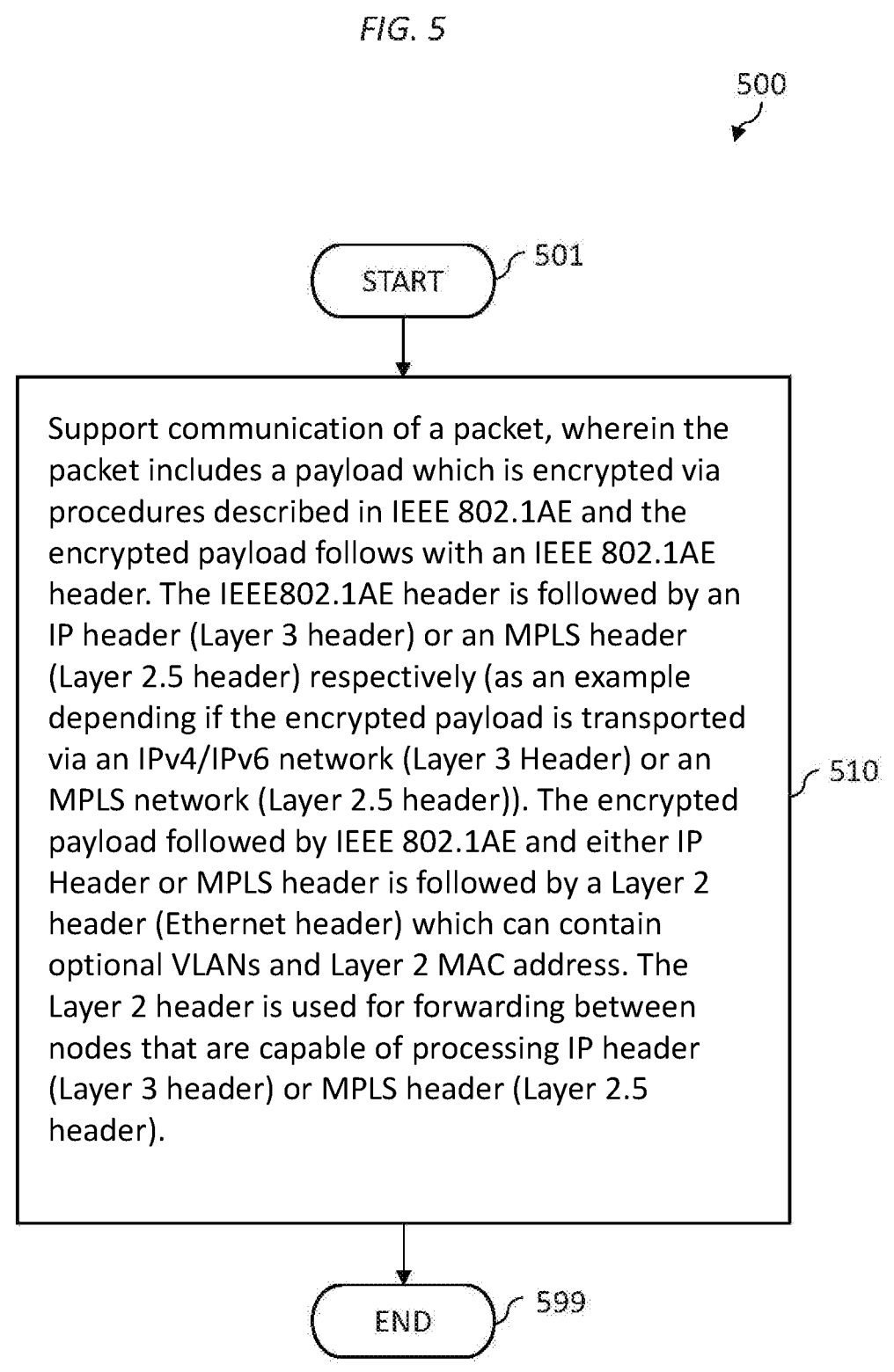

START $\curvearrowright$ 501

Support communication of a packet, wherein the packet includes a payload which is encrypted via procedures described in IEEE 802.1AE and the encrypted payload follows with an IEEE 802.1AE header. The IEEE802.1AE header is followed by an IP header (Layer 3 header) or an MPLS header (Layer 2.5 header) respectively (as an example depending if the encrypted payload is transported via an IPv4/IPv6 network (Layer 3 Header) or an MPLS network (Layer 2.5 header)). The encrypted payload followed by IEEE 802.1AE and either IP Header or MPLS header is followed by a Layer 2 header (Ethernet header) which can contain optional VLANs and Layer 2 MAC address. The Layer 2 header is used for forwarding between nodes that are capable of processing IP header (Layer 3 header) or MPLS header (Layer 2.5 header).

510

END $\curvearrowright$ 599

| 702 | 704 | 706 | 708 | 710 |
|---|---|---|---|---|
| LAYER 2 HEADER | IP HEADER | UDP HEADER | 802.1x HEADER | MKA PAYLOAD |

FIG. 7          700

KEY DISTRIBUTION OVER IP/UDP

CROSS-REFERENCE TO RELATED APPLICATIONS

This is a continuation-in-part of co-pending application Ser. No. 17/514,046 ("the '046 application") filed Oct. 29, 2021, the teachings of which are incorporated herein by reference in their entirety.

BACKGROUND

Field of the Disclosure

Various example embodiments relate generally to communication networks and, more particularly but not exclusively, to security for communications protocols in communication networks.

Description of the Related Art

In communication systems, various communications technologies may be used to support communications, including use of communication security capabilities to support security for communications of communication systems.

SUMMARY

In at least some example embodiments, a transmitting (TX) node comprises at least one processor and at least one memory including computer program code. The at least one memory and the computer program code are configured to, with the at least one processor, cause the TX node to at least (i) generate an MKA (MACsec (Media Access Control Security) Key Agreement) packet comprising a Layer 2 header, an Internet Protocol (IP) header, a User Datagram Protocol (UDP) header, an IEEE 802.1x header, and an MKA payload containing an encryption key for encrypting a packet flow transmitted from the TX node to a receiving (RX) node and (ii) transmit the MKA packet to the RX node via a Layer 3 transport. In at least some of the above TX embodiments, the encryption key is a Secure Association Key (SAK). In at least some of the above TX embodiments, the TX node is configured to receive the SAK from a key server using Advanced Encryption Standard (AES) Key Wrap. In at least some of the above TX embodiments, the TX node is configured to encrypt the encryption key in the MKA packet using AES Key Wrap. In at least some of the above TX embodiments, the IEEE 802.1x header comprises a Security Channel Identification (SCI) that uniquely identifies the packet flow and the encrypting TX node. In at least some of the above TX embodiments, the SCI comprises an encryption segment identifier (SID) to identify the encrypting TX node and a unique identifier of a tunnel on the encrypting TX node. In at least some of the above TX embodiments, the TX node is configured to generate the unique identifier locally and transmit the SCI to the RX node using MKA over IP/UDP header. In at least some of the above TX embodiments, the TX node is configured to use the encryption key to encrypt packets of the packet flow and transmit the encrypted packets to the RX node via Layer 2.5/3 transport.

In at least some of the above TX embodiments, the Layer 2.5/3 transport is a Layer 2.5 Multiprotocol Label Switching (MPLS) transport. In at least some of the above TX embodiments, the Layer 2.5/3 transport is a Layer 3 Internet Protocol (IP) transport. In at least some of the above TX embodiments, the Layer 3 transport is IP transport. In at least some example embodiments, a receiving (RX) node comprises at least one processor and at least one memory including computer program code. The at least one memory and the computer program code are configured to, with the at least one processor, cause the RX node to at least (i) receive, from a transmitting (TX) node via a Layer 3 transport, an MKA packet comprising a Layer 2 header, an IP header, a UDP header, an IEEE 802.1x header, and an MKA payload containing an encryption key for decrypting a packet flow transmitted from the TX node to the RX node and (ii) process the MKA packet to obtain the SAK. In at least some of the above RX embodiments, the encryption key is a SAK. In at least some of the above RX embodiments, the encryption key is encrypted in the MKA packet using AES Key wrap. In at least some of the above RX embodiments, the IEEE 802.1x header comprises an SCI that uniquely identifies the packet flow and the encrypting TX node. In at least some of the above RX embodiments, the SCI comprises an encryption SID to identify the encrypting TX node and a unique identifier of a tunnel on the encrypting TX node. In at least some of the above RX embodiments, the RX node is configured to receive the SCI from the TX node using MKA over IP/UDP header. In at least some of the above RX embodiments, the RX node is configured to receive encrypted packets of the packet flow from the TX node via the Layer 2.5/3 transport and use the encryption key to decrypt the encrypted packets. In at least some of the above RX embodiments, the Layer 2.5/3 transport is a Layer 2.5 MPLS transport. In at least some of the above RX embodiments, the Layer 2.5/3 transport is a Layer 3 IP transport. In at least some of the above RX embodiments, the Layer 3 transport is IP transport.

BRIEF DESCRIPTION OF THE DRAWINGS

The teachings herein can be readily understood by considering the following detailed description in conjunction with the accompanying drawings, in which:

FIG. 5 depicts an example embodiment of a method for supporting security for communications;

FIG. 7 depicts an example embodiment of a packet format for illustrating a new MKA packet transported via EAPoL.

To facilitate understanding, identical reference numerals have been used herein, wherever possible, in order to designate identical elements that are common among the various figures.

DETAILED DESCRIPTION

Figure 1:
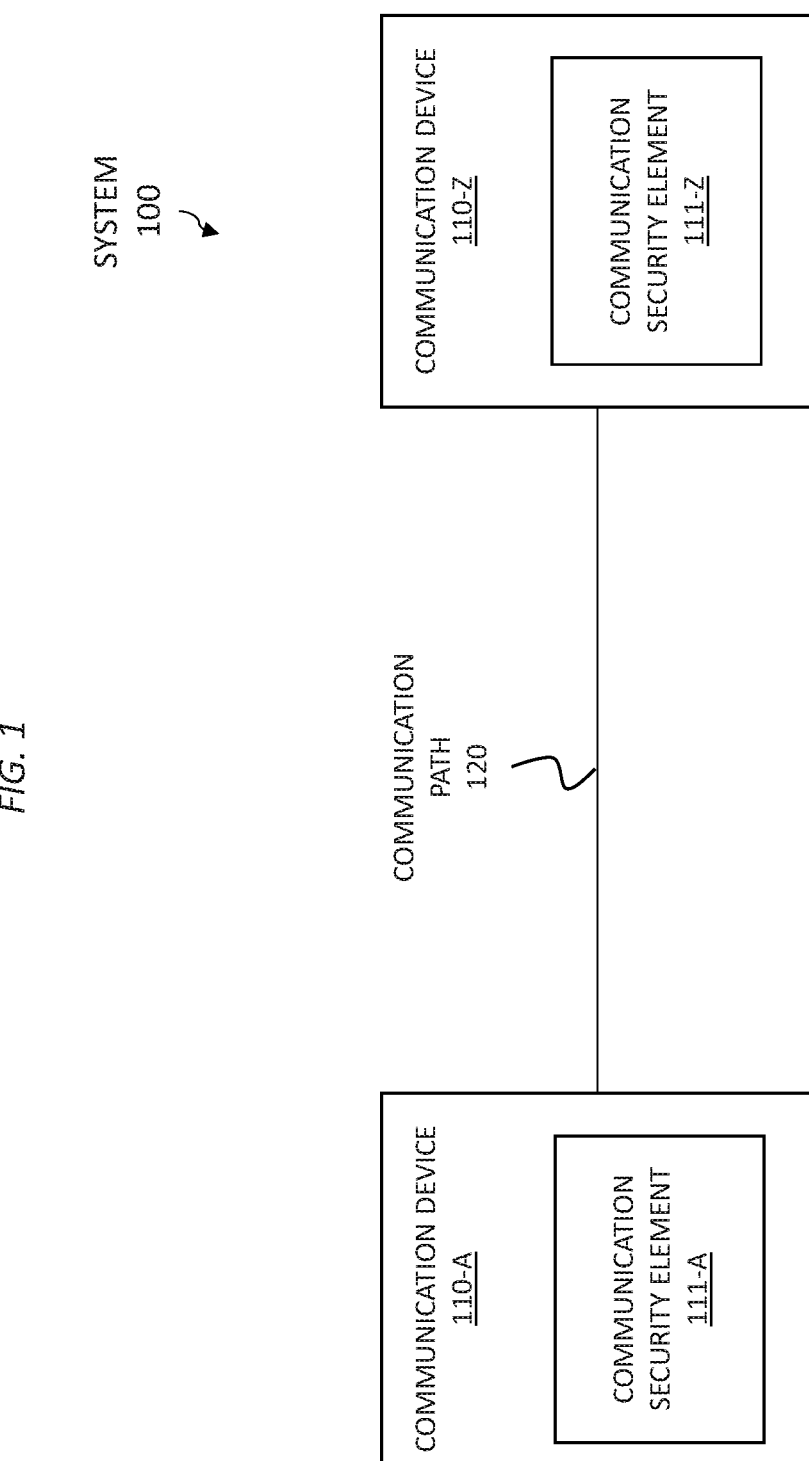
FIG. 1 depicts an example embodiment of a system configured to support security for communications.

Various example embodiments for supporting security for communications are presented. Various example embodiments for supporting security for communications may be configured to support security for communications of communication protocols at various Open Systems Interconnection (OSI) Layers. Various example embodiments for supporting security for communications may be configured to support security for communications of communication protocols operating above Layer 2 using a Layer 2 network security protocol. Various example embodiments for supporting security for communications may be configured to support security for communications of communication protocols operating at Layer 2.5 (e.g., Multiprotocol Label Switching (MPLS) protocols or other suitable Layer 2.5 protocols) using some aspects of a Layer 2 network security protocol (e.g., an Institute of Electrical and Electronics Engineers (IEEE) 802 protocol such as IEEE 802.1AE or other suitable type of Layer 2 network security protocol). Various example embodiments for supporting security for communications may be configured to support security for communications of communication protocols operating at Layer 3 (e.g., Internet Protocol (IP), such as IP version 4 (IPv4) or IP version 6 (IPv6), or other suitable Layer 3 protocols) using a Layer 2 network security protocol. Various example embodiments for supporting security for communications may be configured to support security for communications of communication protocols operating above Layer 2, using some aspects of a Layer 2 network security protocol. Various example embodiments for supporting security for communications may enable support for security for communications of a communication protocol operating above Layer 2, using a Layer 2 network security protocol, in a manner that enables devices along the communication path that operate using the communication protocol above Layer 2 to operate on the header of the communication protocol operating above Layer 2 (e.g., operate on the header such as by reading and modifying the header, such that a Layer 2.5 MPLS-capable router can make decisions based on the MPLS header, a Layer 3 IPcapable router can make decisions based on the IP header, and so forth). Various example embodiments for supporting security for communications may be configured to support security for communications of communication protocols operating above Layer 2, using some aspects of a Layer 2 network security protocol, where the Layer 2 network security protocol is configured to support encryption functions and authentication functions (e.g., an Institute of Electrical and Electronics Engineers (IEEE) 802 protocol such as IEEE 802.1AE or other suitable type of Layer 2 network security protocol). It will be appreciated that these and various other example embodiments and advantages or potential advantages of supporting network security for packets may be further understood by way of reference to the various figures, which are discussed further below.

FIG. 1 depicts an example embodiment of a system configured to support security for communications.

The system 100 includes a pair of communication devices 110-A and 110-Z (collectively, communication devices 110) which may communicate over a communication path 120. The communication devices 110 may be any devices which may communicate over a communication path and the communication path 120 may be any path over which communication devices may communicate and, thus, the communication devices 110 and the communication path 120 may be associated with various communication contexts. For example, the communication devices 110 may include end user devices, routers, switches, or the like. For example, the communication path 120 may represent a single link, multiple links, a portion of a communication network, a communication network, multiple communication networks, or the like. For example, the communication devices 110-A and 110-Z may be, respectively, a customer router and a provider router, a pair of provider routers, a pair of customer routers communicating over a communication network (e.g., customer routers associated with Enterprise networks, customer routers associated with data center networks, or the like), or the like. It will be appreciated that the foregoing examples are merely a few of the ways in which example embodiments may be used to support security for communications of communication devices.

The communication devices 110 are configured to support security for communications exchanged between the communication devices 110 over the communication network 120. The communication devices 110 may be configured to support security for communications based on a network security protocol that supports encryption functions and authentication functions. For example, for packets being sent from the communication device 110-A to the communication device 110-Z, the communication device 110-A may apply encryption and authentication to the packets based on the network security protocol and the communication device 110-Z may validate the authentication and perform decryption based on the network security protocol. Similarly, for example, for packets being sent from the communication device 110-Z to the communication device 110-A, the communication device 110-Z may apply encryption and authentication to the packets based on the network security protocol and the communication device 110-A may validate the authentication and perform decryption based on the network security protocol.

The communication devices 110 may be configured to support security for communications of communication protocols operating above Layer 2 using a Layer 2 network security protocol. The communication devices 110 may be configured to support security for communications of communication protocols operating at Layer 2.5 (e.g., Multiprotocol Label Switching (MPLS) protocols or other suitable Layer 2.5 protocols) using a Layer 2 network security protocol. The communication devices 110 may be configured to support security for communications of communication protocols operating at Layer 3 (e.g., Internet Protocol (IP), such as IP version 4 (IPv4) or IP version 6 (IPv6), or other suitable Layer 3 protocols) using a Layer 2 network security protocol. The communication devices 110 may be configured to support security for communications of communication protocols operating above Layer 2, using a Layer 2 network security protocol, where the communications protocols operating above Layer 2 are transported using a communications protocol operating at Layer 2 (e.g., Ethernet or other suitable Layer 2 communication protocols). The communication devices

110 may be configured to support security for communications of communication protocols operating above Layer 2, using some aspects of a Layer 2 network security protocol, where the Layer 2 network security protocol is configured to support encryption functions and authentication functions (e.g., an Institute of Electrical and Electronics Engineers (IEEE) 802 protocol such as IEEE 802.1AE or other suitable type of Layer 2 network security protocol). The communication devices 110 may be configured to support security for communications in a manner that enables portions of the packets to be left in the clear (i.e., unencrypted and unauthenticated) such that devices along the communication path 120 can handle the packets based on the portions of the packets left in the clear (e.g., switching MPLS labels where the packets are MPLS packets, routing based on IP addresses where the packets are IP packets, or the like, as well as various combinations thereof).

The communication devices 110 may be configured to support security for communications based on use of communication security elements 111. More specifically, the communication device 110-A may be configured to support security for packets transmitted toward communication device 110-Z (e.g., encryption and authentication computation functions) and packets received from communication device 110-Z (e.g., decryption and authentication verification functions) based on a communication security element 111-A and, similarly, the communication device 110-Z may be configured to support security for packets transmitted toward communication device 110-A (e.g., encryption and authentication computation functions) and packets received from communication device 110-A (e.g., decryption and authentication verification functions) based on a communication security element 111-Z. The communication security elements 111 may be configured to support various other functions for supporting security for communications according to various example embodiments presented herein.

It will be appreciated that the system 100, although primarily presented within the context of a relatively simple arrangement of elements, may be any system including any elements (e.g., devices, networks, or the like) which may support secure communications according to various example embodiments presented herein.

Various example embodiments for supporting security for communications may be configured to support security for communications of communication protocols operating at Layer 2.5 (e.g., MPLS) using some aspects of a Layer 2 network security protocol (e.g., IEEE 802.1AE).

Various example embodiments for supporting security for communications may enable support for security for communications of a Layer 2.5 communication protocol such as MPLS, using some aspects of a Layer 2 network security protocol such as IEEE 802.1AE, in a manner enabling devices along the communication path that operate using the Layer 2.5 communication protocol to operate on the Layer 2.5 communication protocol header (e.g., operating on the header, such as by reading and modifying the header, such that a Layer 2.5 MPLS-capable router can make decisions based on the MPLS header). In this manner, throughout the network, the MPLS header is left in clear and unauthenticated so that any LSR router can read and modify the MPLS header in order to forward the packet from one PE to the next PE. It will be appreciated that this operation may be quite dynamic, and the user may be able to dictate, via configuration, which MPLS tunnels or services should be encrypted (although it will be appreciated that this type of selective application of embodiments for supporting security for MPLS communications also may be automated in various ways).

Many networks use MPLS as a transport layer and, thus, moving forward, security and encryption are expected to be important for MPLS transport in many contexts. For example, with increasing numbers of cyberattacks, there is an increasing need for low latency and high throughput encryption to secure the MPLS transport layer. Encryption, however, consumes a significant amount of resources in the network (e.g., increased use of central processing unit (CPU) power, increased latency that is added to the transport for performing the encryption action, and so forth) and thus, is a relatively expensive operation in the network. Additionally, MPLS encryption generally is not used in networks since most encryption is done at Layer 3 IP (i.e., IPSec) and Layer 2 Ethernet (i.e., MACSec).

Various example embodiments may be configured to support MPLS security using some aspects of IEEE 802.1AE in a manner that supports MPLS datapath security, supporting encryption and authentication of MPLS packets at line rate at the tunnel layer or service layer, with relatively low CPU resource usage and introduction of relatively small or no additional latency for the encryption and authentication functions. The MPLS encryption may use some aspects of the IEEE 802.1AE standard (which typically is used in Layer 2 Ethernet encryption (i.e., MACSec)) and an Advanced Encryption Standard Galois/Counter Mode (AES-GCM) algorithm (e.g., based on AES-128, AES-256, or the like) to encrypt any MPLS packet at the tunnel layer or service layer.

In various example embodiments, in order to enable MPLS security via some aspects of IEEE 802.1AE the following capabilities may be used.

In order to support MPLS security using some aspects of IEEE 802.1AE, the desired tunnel or service to be encrypted may be identified. The desired tunnel or service to be encrypted may be identified based on label values. If a tunnel is being encrypted, the service label can be encrypted or left in clear. If a service is being encrypted, the service label needs to be in clear text. For example, the hardware used for encryption may be configured to lock into the label stack of the tunnel or the label stack of the tunnel and service and identify the tunnel or the service as being encryption-enabled (e.g., an encryption-enabled tunnel or encryption-enabled service) and only encrypt that tunnel or service via AES-GCM-128/256.

In order to support MPLS security using some aspects of IEEE 802.1AE, the MPLS label stack for the tunnel or tunnel and service will be placed on top of the 802.1AE header and will not be encrypted or authenticated. This enables the MPLS network to read the MPLS header and operate on the MPLS header, For example, leaving the MPLS header unencrypted and unauthenticated enables the MPLS network to read the MPLS label stack and make the appropriate forwarding decision based on the MPLS label stack. If the MPLS label stack is encrypted then the MPLS network will not be able to read the MPLS label stack to read the label values and make the appropriate forwarding decisions based on the label values.

For example, leaving the MPLS header unencrypted and unauthenticated enables the MPLS network to manipulate the MPLS label stack as needed, such as where labels will be removed from the MPLS label stack and/or added to the MPLS label stack (e.g., based on MPLS forwarding standards like MPLS fast re-route (FRR) or segment routing (SR) where certain labels are popped and/or pushed on the path of the LSP). If the authentication is calculated over the MPLS label stack and the MPLS label stack changes along the path of the MPLS packet, then the CRC calculated at the destination will fail. In order to avoid this type of authentication failure while still permitting manipulation of the MPLS label stack, as noted above, authentication is not calculated over the MPLS label stack.

In order to support MPLS security using some aspects of IEEE 802.1AE, if the MPLS packet is being transported over an Ethernet technology, the Ethernet header also may be left unencrypted and unauthenticated, thereby enabling operations on the Ethernet header without causing a failure of the CRC check at the destination.

Figure 2:
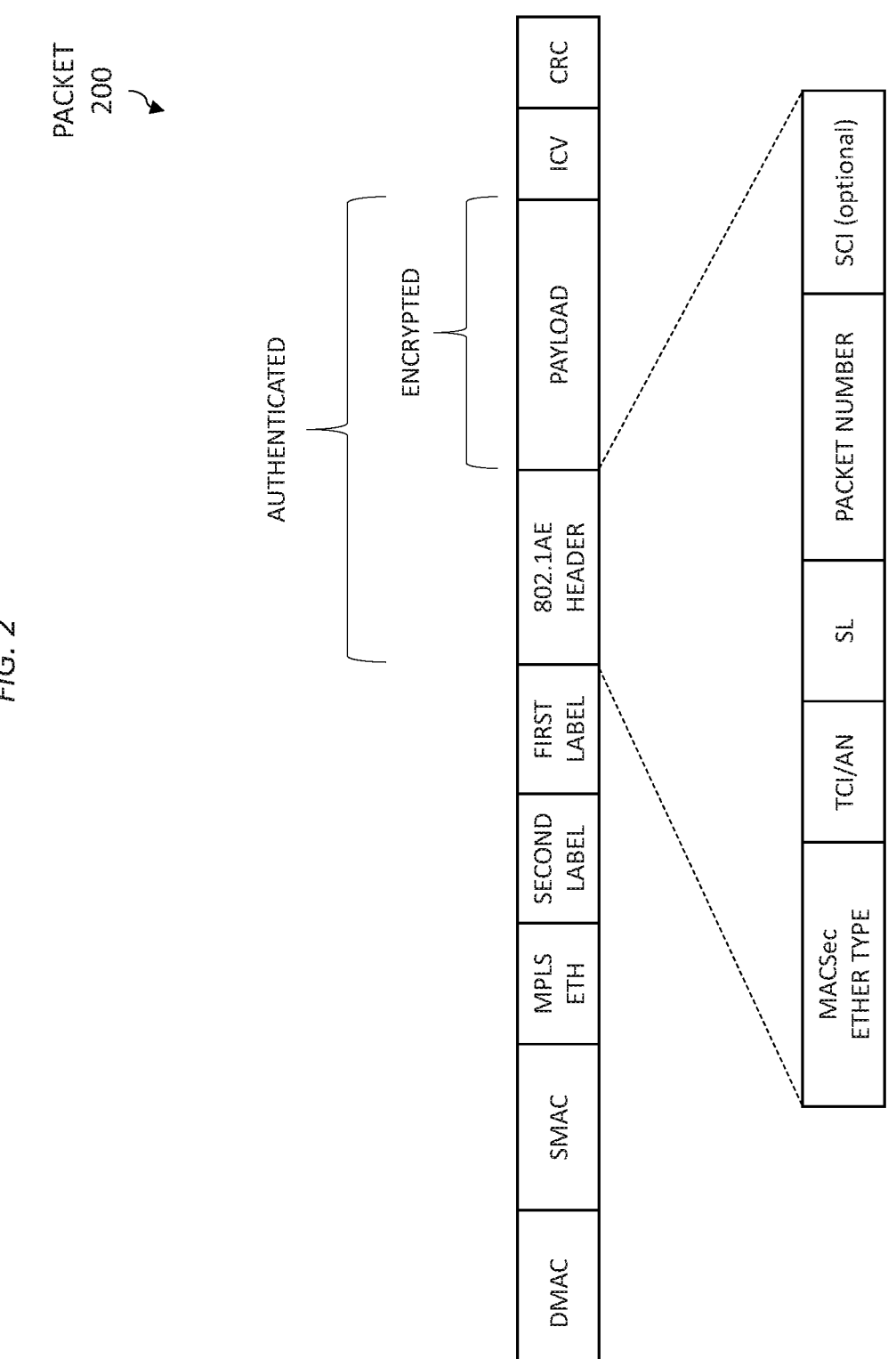
FIG. 2 depicts an example embodiment of a packet format for illustrating application of encryption and authentication to a packet in a manner for supporting MPLS security using some aspects of IEEE 802.1AE.

It will be appreciated that application of encryption and authentication to a packet in a manner for supporting MPLS security using some aspects of IEEE 802.1AE may be further understood by way of reference to the packet format of FIG. 2.

FIG. 2 depicts an example embodiment of a packet format for illustrating application of encryption and authentication to a packet in a manner for supporting MPLS security using some aspects of IEEE 802.1AE. As illustrated in FIG. 2, the packet 200 includes a payload, an 802.1AE Header prepended to the payload, an MPLS header prepended to the 802.1AE header (including a First Label prepended to the 802.1AE Header and a Second Label prepended to the First Label), an Ethernet header prepended to the MPLS header (including an EtherType MPLS field prepended to the Second Label, an SMAC field prepended to the EtherType MPLS field, and a DMAC field prepended to the SMAC field), an Integrity Check Value (ICV) field appended to the payload, and a Cyclic Redundancy Check (CRC) field appended to the ICV field. The packet 200 includes a first portion which is encrypted (including the payload), a second portion which is authenticated (including the payload and the 802.1AE header), and a third portion which is neither encrypted nor authenticated (including the MPLS header, the Ethernet header, and the ICV and CRC fields). It will be appreciated that, although primarily presented with respect to example embodiments in which specific types of MPLS labels are left unencrypted and unauthenticated for supporting MPLS security using some aspects of IEEE 802.1AE, various other types of MPLS labels may be left unencrypted and unauthenticated in order to support MPLS security using some aspects of IEEE 802.1AE for various types of MPLS solutions (e.g., Border Gateway Protocol (BGP)-Labeled Unicast (BGP-LU) labels, Entropy Label Indicator (ELI) labels, Entropy Labels (ELs), or the like, as well as various combinations thereof. As indicated herein, this leaves the MPLS header unencrypted and unauthenticated, thereby enabling devices along the path to operate on the MPLS header as needed.

In order to support MPLS security using some aspects of IEEE 802.1AE, the label edge routers (LERs) involved in communication of the MPLS packet—namely, the ingress LER (ILER) and egress LER (ELER)—may be configured to support various functions for supporting MPLS security using some aspects of IEEE 802.1AE.

In order to support MPLS security using some aspects of IEEE 802.1AE, the ILER is configured to encrypt and authenticate a specific MPLS tunnel or service. The ILER pushes the appropriate MPLS labels for the MPLS tunnel or service on top of the packet. The ILER programs the hardware with this MPLS label stack to be encrypted and authenticated and appropriate AES-GCM-128/256 keys to identify and encrypt this MPLS tunnel or service as an encrypted MPLS tunnel or service. The packet is built with the appropriate MPLS labels and passed through 802.1AE MPLS encryption (e.g., using 802.1AE MPLS encryption capable hardware). The ILER examines each MPLS packet and, if an MPLS packet matches the MPLS label stack of this specific MPLS tunnel or service, encrypts the packet. The ILER adds an 802.1AE header after the MPLS label stack as per some aspects of IEEE 802.1AE standard and then encrypts the payload of the packet (i.e., the data after the MPLS stack) as per some aspects of IEEE 802.1AE and using AES-GCM-128/256. The ILER also runs authentication (e.g., using an authentication algorithm) over the 802.1AE header and the payload, but does not run any authentication over the MPLS label stack or the Ethernet header, thereby allowing the MPLS label stack to be examined and manipulated via the MPLS LSR routers connecting the MPLS encrypting and decrypting routers.

In order to support MPLS security using some aspects of IEEE 802.1AE, the ILER may support use of encryption and authentication offsets in order to apply encryption and authentication to the portions of the packet to be encrypted and authenticated, respectively. The encryption and authentication offsets may be specified in various ways (e.g., using start byte/bit location and length, start and end byte/bit locations, or the like). The ILER may support use of programmable and flexible encryption and authentication offsets to identify the portions of the packet to be encrypted and authenticated, respectively. The ILER may calculate the encryption and authentication offsets based on the set of MPLS labels included in the MPLS header of the MPLS tunnel or service (e.g., the software calculates the encryption and authentication offsets). The ILER (e.g., hardware and/or software) may be flexible enough and programmable enough to allow programming of any offset for encryption and any offset for authentication, thereby allowing any packet to be encrypted and authenticated at the appropriate offset based on the flow encryption and authentication needs. The ILER, given various network scenarios that may be applied for a given MPLS tunnel or service, may maintain multiple sets of encryption and authentication offsets for the given MPLS tunnel or service in order to support proper application of encryption and authentication to the MPLS tunnel or service for the various network scenarios that may be applied for the given MPLS tunnel or service. It will be appreciated that encryption and authentication offsets for few or more, as well as different, network scenarios may be maintained by the ILER for various MPLS tunnel or service supported by the ILER.

In order to support MPLS security using some aspects of IEEE 802.1AE, the encrypted packet is forwarded through an MPLS forwarding network, from the ILER to the ELER, with LSR routers capable of performing various operations on the encrypted packet based on the appropriate OSI Layer header(s) being in the clear. For example, these LSR routers can make switching decisions based on the MPLS label stack. For example, these LSR routers can manipulate the MPLS label stack as needed and as per IETF MPLS standards (e.g., removing and/or adding labels for FRR, traffic engineering (TE), or the like, as well as various combinations thereof). It will be appreciated that the LSR routers may be capable of performing these, as well as various other, operations on the encrypted packet based on the MPLS header being unencrypted and unauthenticated.

In order to support MPLS security using some aspects of IEEE 802.1AE, the ELER is configured to decrypt a specific MPLS tunnel or service and support authentication for the specific MPLS tunnel or service. When the packet reaches the ELER, the MPLS label stack will identify this router as an ELER router. The ELER will be IEEE 802.1AE aware, such that it is capable of decrypting the MPLS tunnel or service packet. The ELER is programmed with an arriving MPLS label stack such that the arriving MPLS label stack may be used by the ELER to identify the MPLS tunnel or the service as an encrypted MPLS tunnel or service. The ELER, based on identification of the MPLS label stack in the packet as matching the arriving MPLS label stack which indicates that the MPLS label stack is associated with an MPLS tunnel or the service and based on the presence of the IEEE 802.1AE header, uses some aspects of IEEE 802.1AE procedures to decrypt the packet and run authentication over the 802.1AE header and the payload in order to ensure that there are no CRC errors. The ELER may then process the packet via the normal MPLS datapath.

It will be appreciated that various example embodiments for supporting MPLS security using some aspects of IEEE 802.1AE, by performing encryption and authentication on portions of the packet excluding the MPLS header (as opposed to encrypting any byte after the 802.1AE header even if it includes the IP and MPLS headers and running authentication over the entire packet), enable MPLS capable routers to selectively use the Layer 2.5 MPLS header to forward encrypted packets through an MPLS domain (e.g., between provider edge routers).

It will be appreciated that, although primarily presented with respect to example embodiments in which MPLS security using some aspects of IEEE 802.1AE includes encryption and authentication, in at least some example embodiments MPLS security using some aspects of IEEE 802.1AE may include authentication without encryption.

It will be appreciated that various example embodiments for supporting security for communications may be configured to support security for communications of communication protocols operating at Layer 2.5, using a Layer 2 network security protocol, may be configured to support various other functions for supporting security for communications of communication protocols operating at Layer 2.5 based on use of the Layer 2 network security protocol.

Various example embodiments for supporting security for communications may be configured to support security for communications of communication protocols operating at Layer 3 (e.g., IP) using some aspects of a Layer 2 network security protocol (e.g., IEEE 802.1AE).

Various example embodiments for supporting security for communications may enable support for security for communications of a Layer 3 communication protocol such as IP, using some aspects of a Layer 2 network security protocol such as IEEE 802.1AE, in a manner enabling devices along the communication path that operate using the Layer 3 communication protocol to operate on the Layer 3 communication protocol header (e.g., operating on the header, such as by reading and modifying the header, such that a Layer 3 IP-capable router can make decisions based on the IP header). In this manner, throughout the network, the IP header is left in clear and unauthenticated so that any IP router can read and, optionally, modify the IP header in order to forward the packet from one PE to the next PE. It will be appreciated that, while an IP header typically is not modified unless in a Segment Routing over IPv6 (SRv6) network, the packet may still be tunneled via MPLS and IP tunneling technologies that might need modification of the header. It will be appreciated that this operation may be quite dynamic, and the user may be able to dictate, via configuration, which IP flows should be encrypted (although it will be appreciated that this type of selective application of embodiments for supporting security for IP communications also may be automated in various ways).

Many networks that use IP provide security for IP based on use of security protocols such as IP Security (IPSec) and the IPSec Encapsulating Security Payload (ESP). IPSec, however, generally consumes significant CPU resources without providing true hardware encryption support and is not at line rate and, further, IPSec ESP results in relatively high latency in packet forwarding. This makes IPSec unsuitable for latency-sensitive networking applications such as Time Sensitive Networking (TSN) in which relatively low latency is needed.

Various example embodiments may be configured to support IP security using some aspects of IEEE 802.1AE in a manner that supports IP datapath security, supporting encryption and authentication of IP packets at line rate for selected IP flows, with relatively low CPU resource usage and introduction of relatively small additional latency for the encryption and authentication functions. The IP encryption may use some aspects of the IEEE 802.1AE standard (which typically is used in Layer 2 Ethernet encryption (i.e., MACSec)) and an AES-GCM algorithm (e.g., based on AES-128, AES-256, or the like) to encrypt any IP packet at the IP flow layer.

In various example embodiments, in order to enable IP security via some aspects of IEEE 802.1AE the following capabilities may be used.

In order to support IP security using some aspects of IEEE 802.1AE, the desired IP flow to be encrypted may be identified. The desired IP flow to be encrypted may be identified based various IP flow matching techniques, such as IP header matching in the form of tuple matching or byte matching (e.g., matching the source and destination IP addresses, matching the destination IP address, or the like), deep packet inspection, or the like. For example, the hardware used for encryption may match certain portions of IP packets (e.g., based on a hardware ternary content-addressable memory (TCAM)) to determine whether the IP packets belong to IP flows to which IP security using some aspects of IEEE 802.1AE should be applied.

In order to support IP security using some aspects of IEEE 802.1AE, the IP header for the IP flow will be placed on top of the 802.1AE header and the IP header will not be encrypted or authenticated. This enables the IP network to read the IP header and operate on the IP header.

For example, leaving the IP header unencrypted and unauthenticated enables the IP network to read the IP header and make the appropriate routing decision based on the IP header. If the IP header is encrypted then the IP network will not be able to read the IP header to read the IP header fields and make the appropriate forwarding decisions based on the IP header fields.

For example, leaving the IP header unencrypted and unauthenticated enables the IP network to manipulate the IP header as needed, such as by modifying header fields of the IP header as needed (e.g., decrementing the Time-to-Live (TTL) field, changing the Differentiated Services Code Point (DSCP) field based on the quality-of-service (QOS) configuration of the transit IP router, or the like, as well as various combinations thereof). If the authentication is calculated over the IP header and the IP header changes along the path of the IP packet, then the CRC calculated at the destination will fail.

In order to support IP security using some aspects of IEEE 802.1AE, if the IP flow is being transported over an MPLS technology (e.g., shortcuts, VPRNs, or the like), the MPLS header also may be left unencrypted and unauthenticated, thereby enabling operations on the MPLS header (e.g., based on MPLS forwarding standards like MPLS FRR or SR where certain labels are popped and/or pushed on the path) without causing a failure of the CRC check at the destination.

In order to support IP security using some aspects of IEEE 802.1AE, if the IP flow is being transported over a dot1q technology, the dot1q header may be left unencrypted and unauthenticated, thereby enabling operations on the dot1q tags (e.g., adding and/or removing dot1q tags) without causing a failure of the CRC check at the destination.

In order to support IP security using some aspects of IEEE 802.1AE, if the IP flow is being transported over an Ethernet technology, the Ethernet header may be left unencrypted and unauthenticated, thereby enabling operations on the Ethernet header without causing a failure of the CRC check at the destination.

It is noted that leaving the MPLS header and the Ethernet header in the clear enables transport of the IP flow (e.g., IP transport and tunneling) over any technology (e.g., a dot1q VLAN-switched network, an MPLS network via tunneling the IP packets over an MPLS tunnel, or the like, as well as various combinations thereof).

It will be appreciated that application of encryption and authentication to a packet in a manner for supporting IP security using some aspects of IEEE 802.1AE may be further understood by way of reference to the packet formats of FIGS. 3A-3C and FIGS. 4A-4C.

Figure 3A:
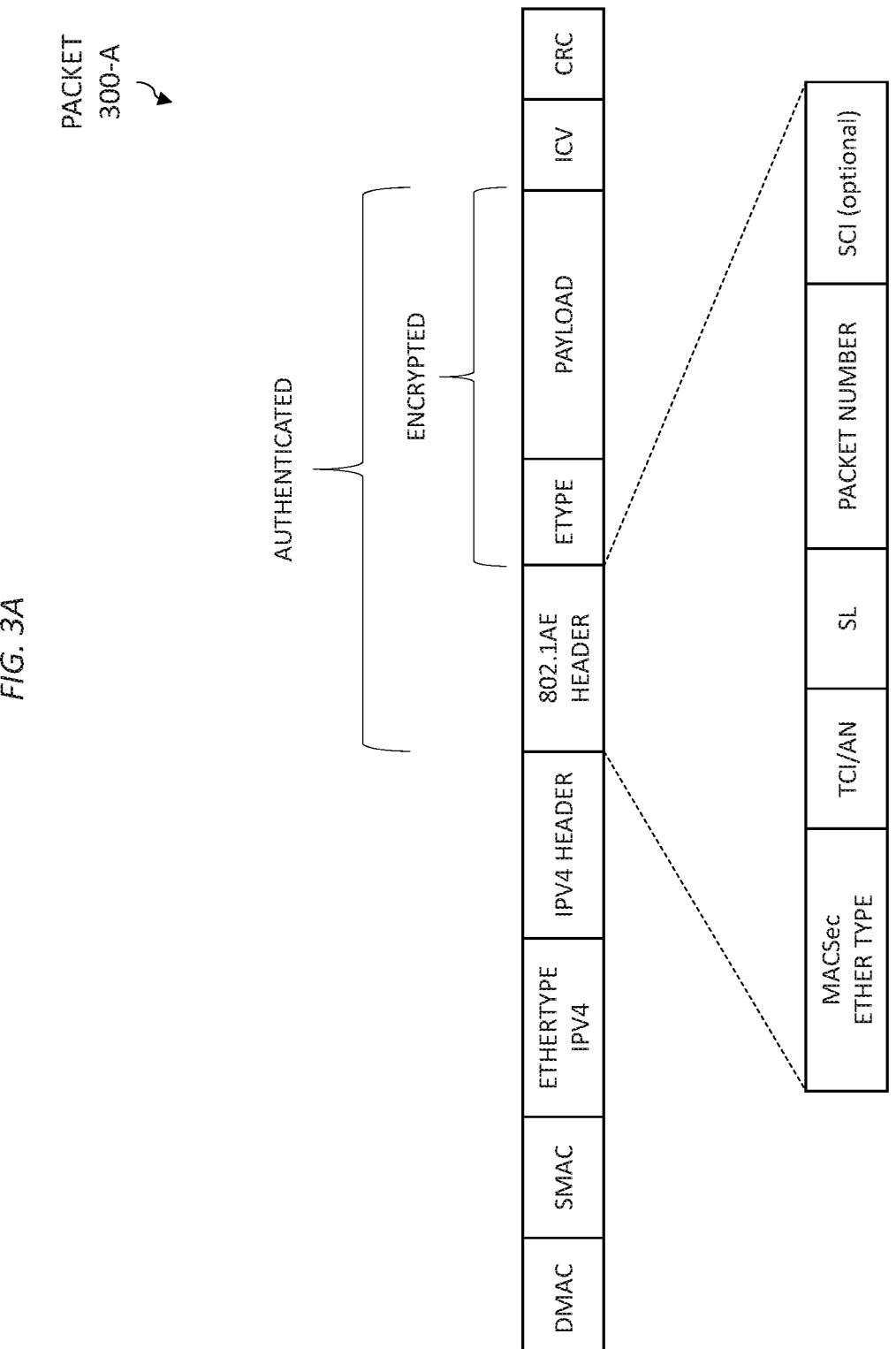
FIGS. 3A-3C depict example embodiments of packet formats for illustrating application of encryption and authentication to a packet in a manner for supporting IP security using some aspects of IEEE 802.1AE.
Figure 3B:
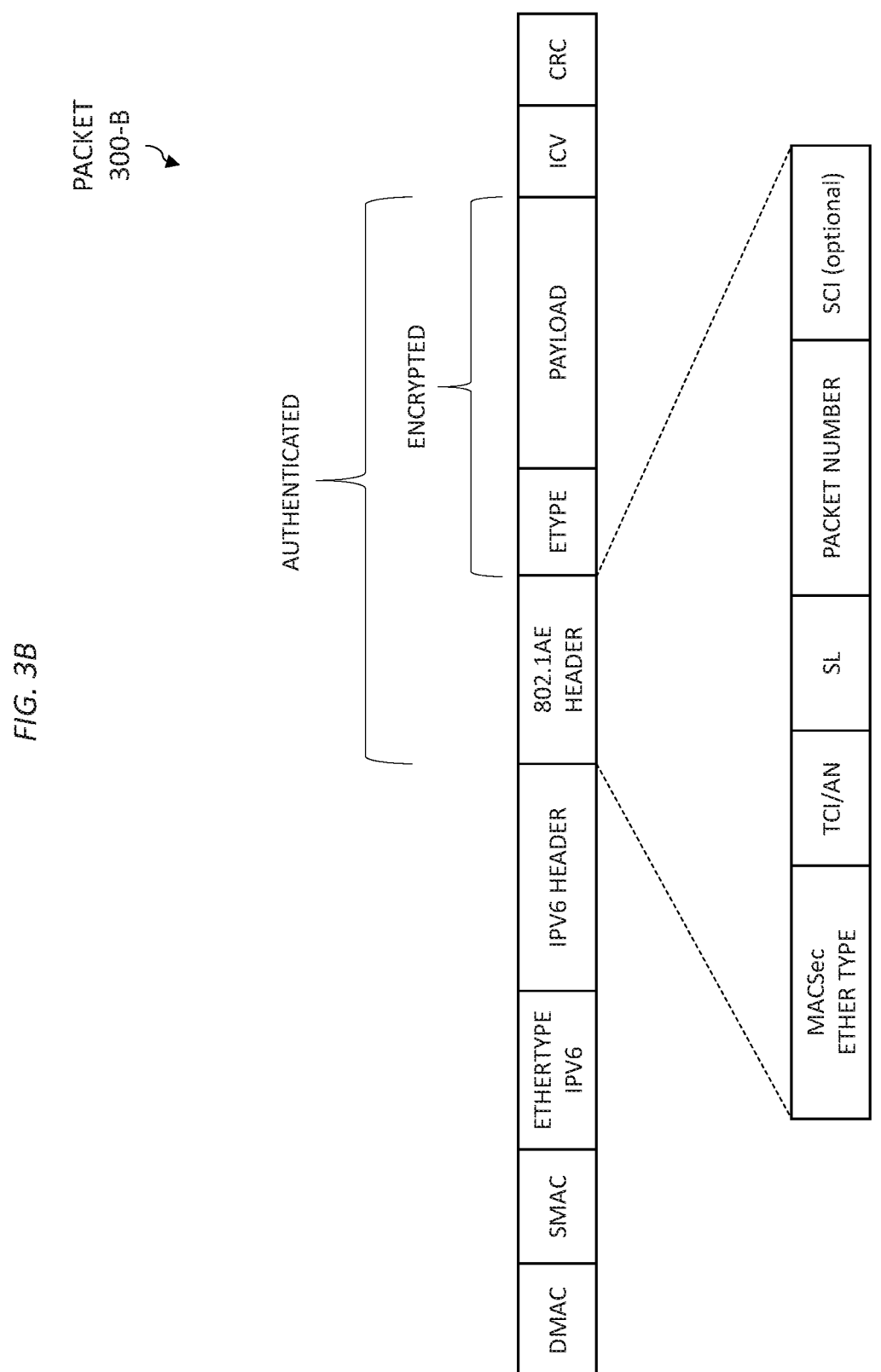
Figure 3C:
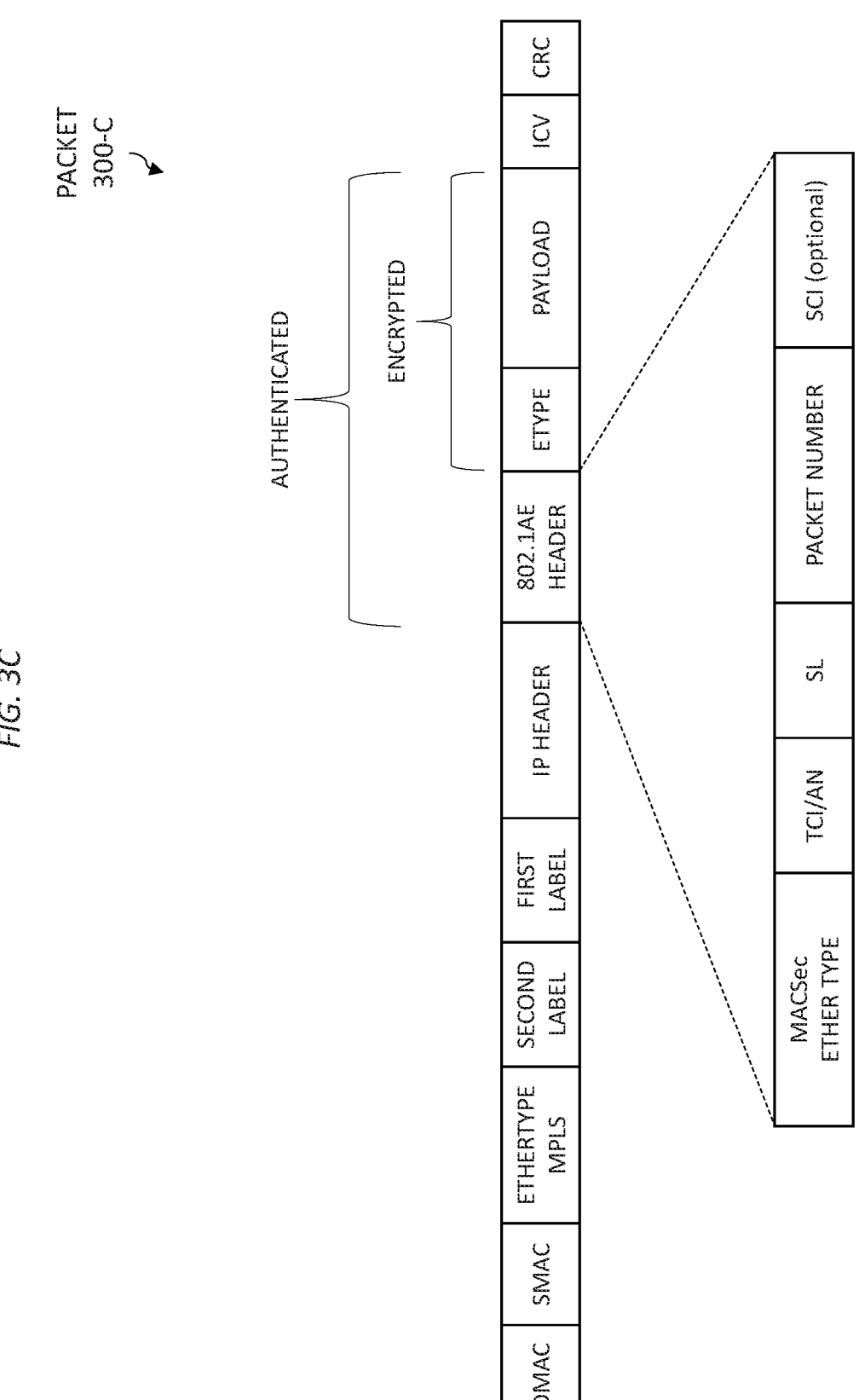

FIGS. 3A-3C depict example embodiments of packet formats for illustrating application of encryption and authentication to a packet in a manner for supporting IP security using some aspects of IEEE 802.1AE. The packet formats of FIG. 3 are configured to support encryption and authentication of the IP packet payload via some aspects of IEEE 802.1AE in a manner that leaves the Layer 3 header, the Layer 2.5 header, and the Layer 2 header in the clear and unauthenticated such that the packet is routable through an IP network and devices along the path can perform operations based on any of these fields that are unencrypted and unauthenticated without any issue or failure at the decrypting router (e.g., removal, modification, and/or addition of various fields or headers at various Layers).

FIG. 3A depicts an example embodiment of a packet format for illustrating application of encryption and authentication to a packet in a manner for supporting IP security for an IPv4 packet using some aspects of IEEE 802.1AE. As illustrated in FIG. 3A, the packet 300-A includes a payload, an EtherType (ETYPE) field prepended to the payload, an 802.1AE Header prepended to the ETYPE field, an IPV4 header prepended to the 802.1AE header, an Ethernet header prepended to the IPV4 header (including an EtherType IPv4 field prepended to the IPV4 header, an SMAC field prepended to the EtherType IPv4 field, and a DMAC field prepended to the SMAC field), an Integrity Check Value (ICV) field appended to the payload, and a Cyclic Redundancy Check (CRC) field appended to the ICV field. The packet 300-A includes a first portion which is encrypted (including the payload and the ETYPE field), a second portion which is authenticated (including the payload, the ETYPE field, and the 802.1AE header), and a third portion which is neither encrypted nor authenticated (including the IPV4 header and the Ethernet header, as well as the ICV and CRC fields). As indicated herein, this leaves the IPV4 header and the Ethernet header unencrypted and unauthenticated, thereby enabling devices along the path to operate on the IPV4 header and/or the Ethernet header as needed.

FIG. 3B depicts an example embodiment of a packet format for illustrating application of encryption and authentication to a packet in a manner for supporting IP security for an IPV6 packet using some aspects of IEEE 802.1AE. As illustrated in FIG. 3B, the packet 300-B includes a payload, an EtherType (ETYPE) field prepended to the payload, an 802.1AE Header prepended to the ETYPE field, an IPV6 header prepended to the 802.1AE header, an Ethernet header prepended to the IPV6 header (including an EtherType IPV6 field prepended to the IPV6 header, an SMAC field prepended to the EtherType IPV6 field, and a DMAC field prepended to the SMAC field), an Integrity Check Value (ICV) field appended to the payload, and a Cyclic Redundancy Check (CRC) field appended to the ICV field. The packet 300-B includes a first portion which is encrypted (including the payload and the ETYPE field), a second portion which is authenticated (including the payload, the ETYPE field, and the 802.1AE header), and a third portion which is neither encrypted nor authenticated (including the IPV6 header and the Ethernet header, as well as the ICV and CRC fields). As indicated herein, this leaves the IPV6 header and the Ethernet header unencrypted and unauthenticated, thereby enabling devices along the path to operate on the IPV6 header and/or the Ethernet header as needed.

FIG. 3C depicts an example embodiment of a packet format for illustrating application of encryption and authentication to a packet in a manner for supporting IP security for an IP packet using some aspects of IEEE 802.1AE where the IP packet is transported based on MPLS. For example, the IP packet may be transported over some portion of the network or across the entire network via an MPLS tunnel. As illustrated in FIG. 3C, the packet 300-C includes a payload, an EtherType (ETYPE) field prepended to the payload, an 802.1AE Header prepended to the ETYPE field, an IP header (which could be IPv4 or IPv6) prepended to the 802.1AE header, an MPLS header prepended to the 802.1AE header (including a First Label prepended to the IP header and a Second Label prepended to the First Label), an Ethernet header prepended to the MPLS header (including an EtherType MPLS field prepended to the Second Label, an SMAC field prepended to the EtherType MPLS field, and a DMAC field prepended to the SMAC field), an Integrity Check Value (ICV) field appended to the payload, and a Cyclic Redundancy Check (CRC) field appended to the ICV field. The packet 300-C includes a first portion which is encrypted (including the payload and the ETYPE field), a second portion which is authenticated (including the payload, the ETYPE field, and the 802.1AE header), and a third portion which is neither encrypted nor authenticated (including the IP header, the MPLS header, and the Ethernet header, as well as the ICV and CRC fields). As indicated herein, this leaves the IP header, the MPLS header, and the Ethernet header unencrypted and unauthenticated, thereby enabling devices along the path to operate on one or more of the IP header, the MPLS header, and/or the Ethernet header as needed.

Figure 4A:
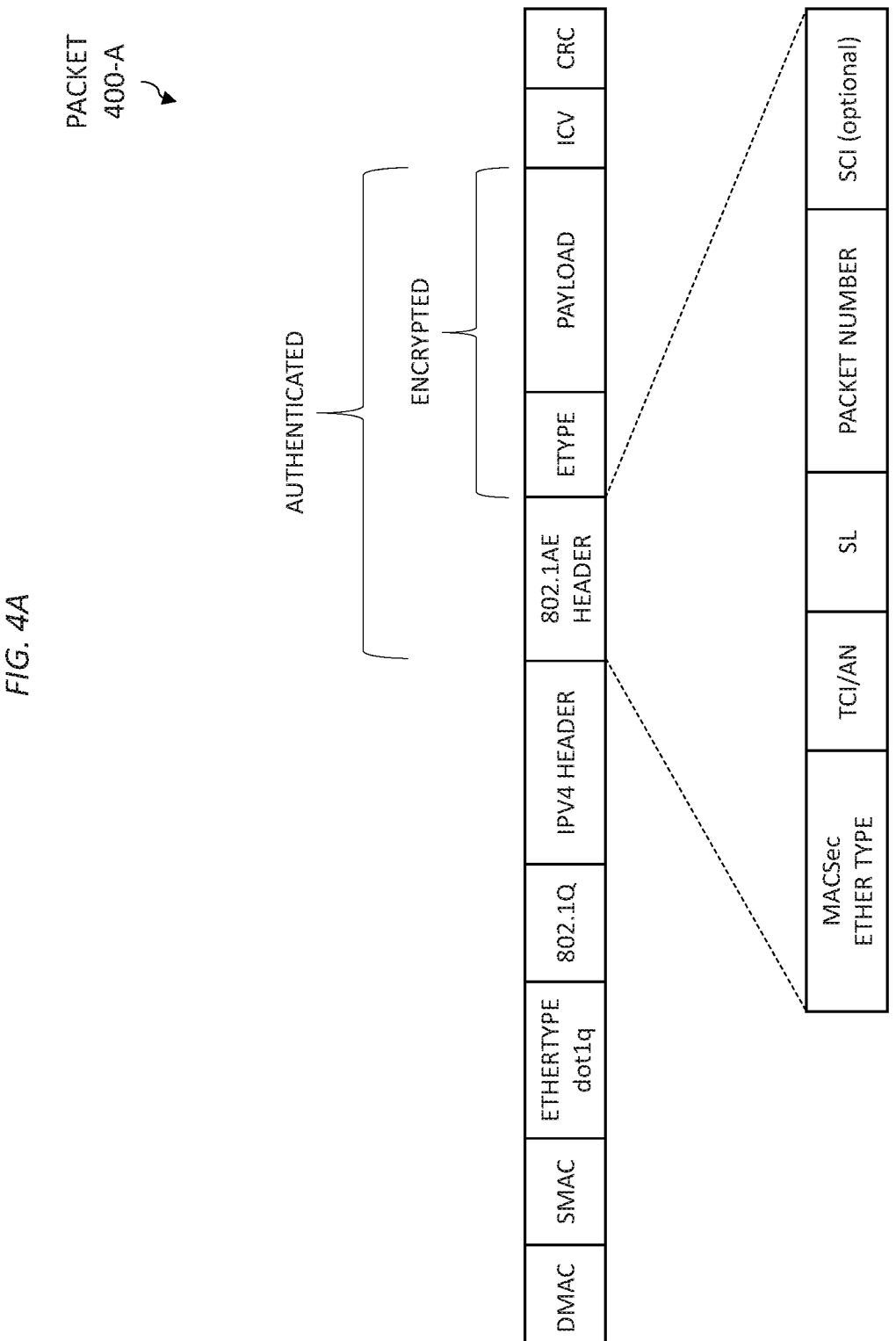
FIGS. 4A-4C depict example embodiments of packet formats for illustrating application of encryption and authentication to a packet in a manner for supporting IP security using some aspects of IEEE 802.1AE.
Figure 4B:
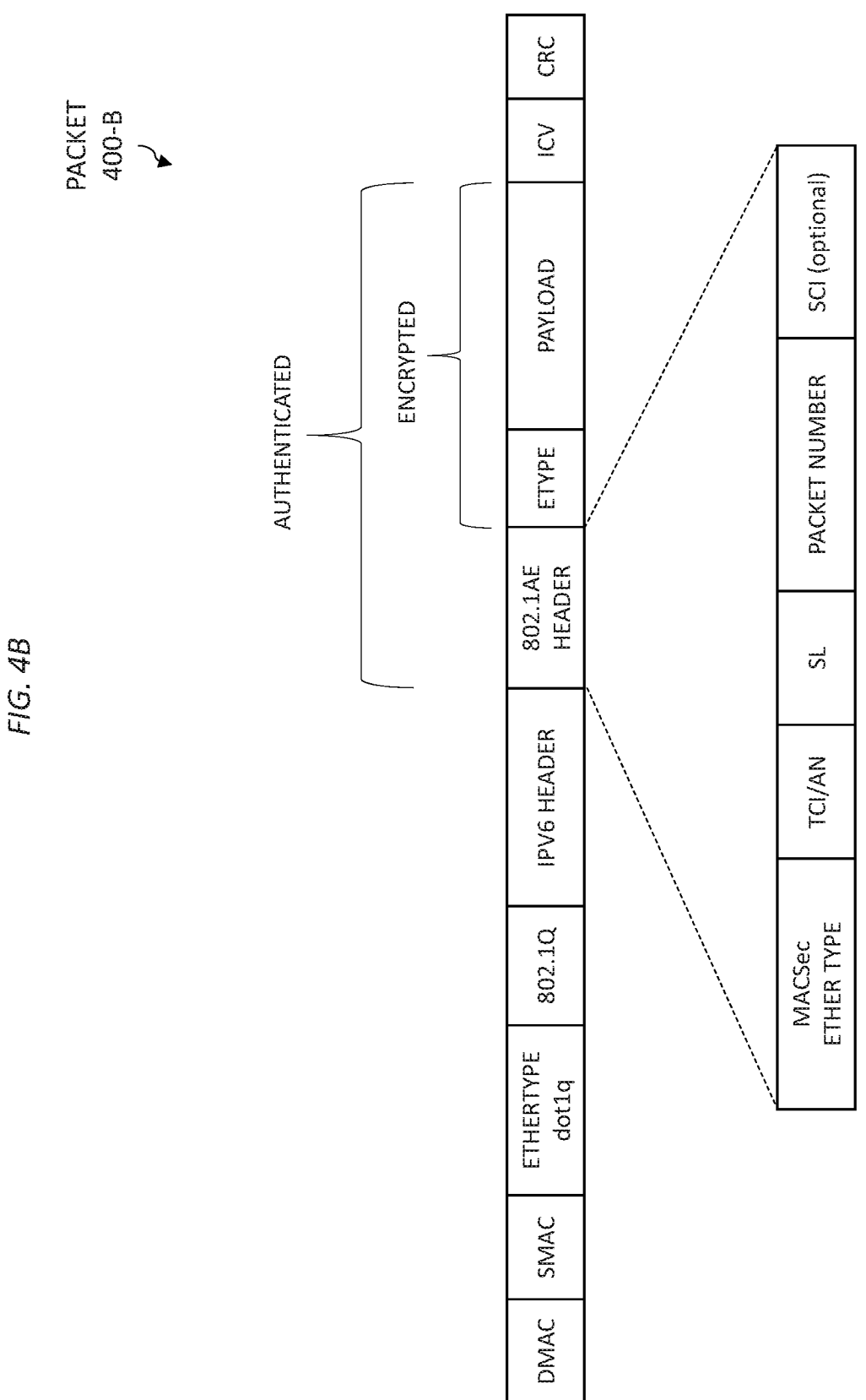
Figure 4C:
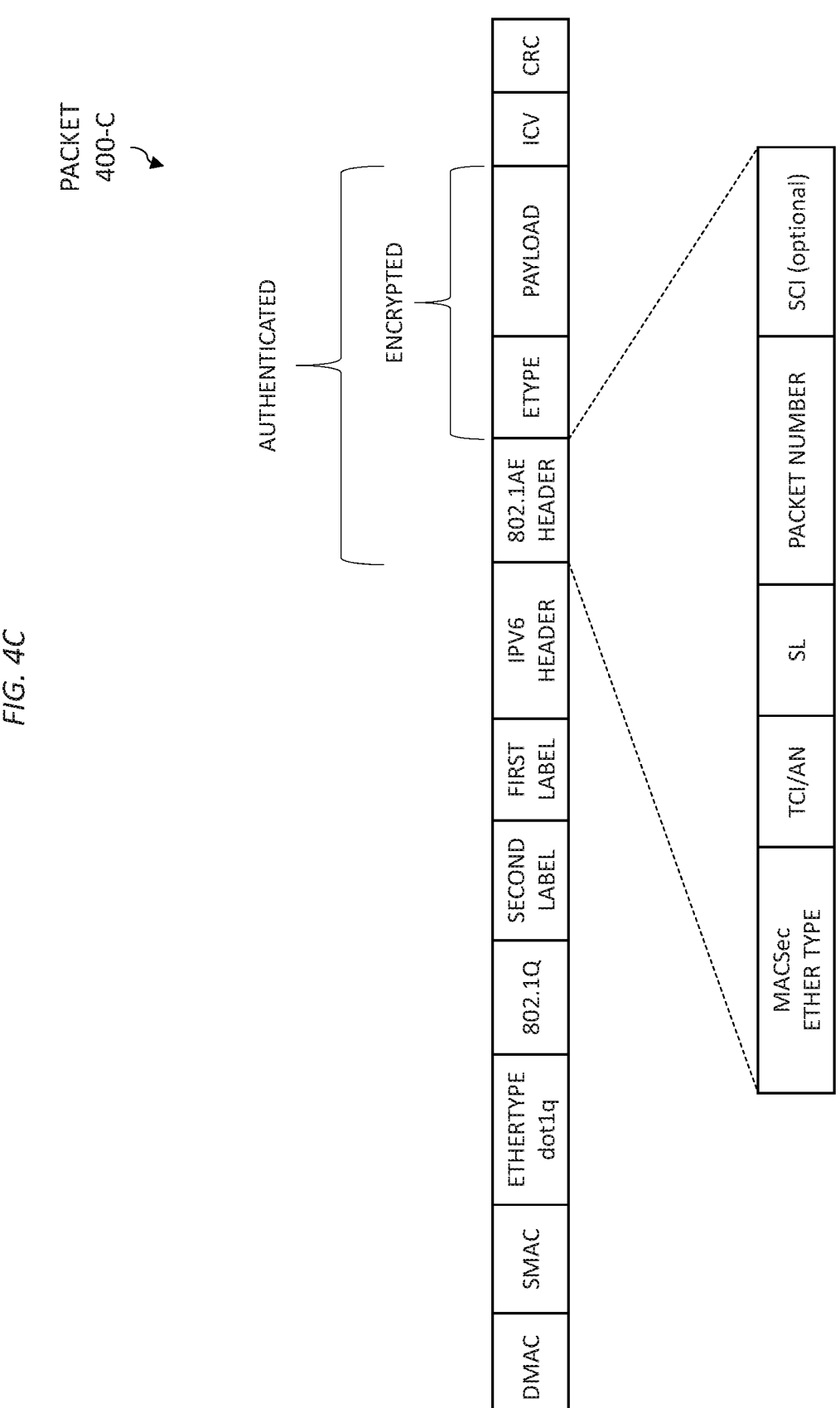

FIGS. 4A-4C depict example embodiments of packet formats for illustrating application of encryption and authentication to a packet in a manner for supporting IP security using some aspects of IEEE 802.1AE. The packet formats of FIGS. 4A-4C are configured to support encryption and authentication of the IP packet payload via some aspects of IEEE 802.1AE in a manner that leaves the Layer 3 header, the Layer 2.5 header, dot1q tags, and the Layer 2 header in the clear and unauthenticated such that the packet is routable through an IP network and devices can perform operations based on any of these fields that are unencrypted and unauthenticated without any issue or failure at the decrypting router (e.g., removal, modification, and/or addition of various fields or headers at various Layers). The packet formats of FIGS. 4A-4C are similar to the packet formats of FIGS. 3A-3C, with the exception that the packet formats of FIGS. 4A-4C also include dot1q tags between the Layer 3 IP header and the Layer 2 Ethernet header (illustratively, an 802.1Q tag on the IP header and an Ethertype dot1q tag on the 802.1Q tag, followed by the SMAC and DMAC of the Layer 2 header).

FIG. 4A depicts an example embodiment of a packet format for illustrating application of encryption and authentication to a packet in a manner for supporting IP security for an IPV4 packet using some aspects of IEEE 802.1AE where the packet also includes dot1q tags. As illustrated in FIG. 4A, the packet 400-A includes a payload, an EtherType (ETYPE) field prepended to the payload, an 802.1AE Header prepended to the ETYPE field, an IPV4 header prepended to the 802.1AE header, an 802.1Q tag prepended to the IPv4 header, an Ethernet header prepended to 802.1Q tag (including an EtherType dot1q field prepended to the 802.1Q tag, an SMAC field prepended to the EtherType dot1q field, and a DMAC field prepended to the SMAC field), an Integrity Check Value (ICV) field appended to the payload, and a Cyclic Redundancy Check (CRC) field appended to the ICV field. The packet 400-A includes a first portion which is encrypted (including the payload and the ETYPE field), a second portion which is authenticated (including the payload, the ETYPE field, and the 802.1AE header), and a third portion which is neither encrypted nor authenticated (including the IPV4 header, the 802.1Q tag, and the Ethernet header, as well as the ICV and CRC fields). As indicated herein, this leaves the IPV4 header, the 802.1Q tag, and the Ethernet header unencrypted and unauthenticated, thereby enabling devices along the path to operate on the IPV4 header, the 802.1Q tag, and/or the Ethernet header as needed.

FIG. 4B depicts an example embodiment of a packet format for illustrating application of encryption and authentication to a packet in a manner for supporting IP security for an IPV6 packet using some aspects of IEEE 802.1AE where the packet also includes dot1q tags. As illustrated in FIG. 4B, the packet 400-B includes a payload, an EtherType (ETYPE) field prepended to the payload, an 802.1AE Header prepended to the ETYPE field, an IPV6 header prepended to the 802.1AE header, an 802.1Q tag prepended to the IPV6 header, an Ethernet header prepended to 802.1Q tag (including an EtherType dot1q field prepended to the 802.1Q tag, an SMAC field prepended to the EtherType dot1q field, and a DMAC field prepended to the SMAC field), an Integrity Check Value (ICV) field appended to the payload, and a Cyclic Redundancy Check (CRC) field appended to the ICV field. The packet 400-B includes a first portion which is encrypted (including the payload and the ETYPE field), a second portion which is authenticated (including the payload, the ETYPE field, and the 802.1AE header), and a third portion which is neither encrypted nor authenticated (including the IPV6 header, the 802.1Q tag, and the Ethernet header, as well as the ICV and CRC fields). As indicated herein, this leaves the IPV6 header, the 802.1Q tag, and the Ethernet header unencrypted and unauthenticated, thereby enabling devices along the path to operate on the IPV6 header, the 802.1Q tag, and/or the Ethernet header as needed.

FIG. 4C depicts an example embodiment of a packet format for illustrating application of encryption and authentication to a packet in a manner for supporting IP security for an IP packet using some aspects of IEEE 802.1AE where the IP packet is transported based on MPLS and where the packet also includes dot1q tags. As illustrated in FIG. 4C, the packet 400-C includes a payload, an EtherType (ETYPE) field prepended to the payload, an 802.1AE Header prepended to the ETYPE field, an IP header (which could be IPv4 or IPv6) prepended to the 802.1AE header, an MPLS header prepended to the 802.1AE header (including a First Label prepended to the IP header and a Second Label prepended to the First Label), an 802.1Q tag prepended to the MPLS header, an Ethernet header prepended to the 802.1Q tag (including an EtherType dot1q field prepended to the 802.1Q tag, an SMAC field prepended to the EtherType dot1q field, and a DMAC field prepended to the SMAC field), an Integrity Check Value (ICV) field appended to the payload, and a Cyclic Redundancy Check (CRC) field appended to the ICV field. The packet 400-C includes a first portion which is encrypted (including the payload and the ETYPE field), a second portion which is authenticated (including the payload, the ETYPE field, and the 802.1AE header), and a third portion which is neither encrypted nor authenticated (including the IP header, the MPLS header, the 802.1Q tag, and the Ethernet header, as well as the ICV and CRC fields). As indicated herein, this leaves the IP header, the MPLS header, the 802.1Q tag, and the Ethernet header unencrypted and unauthenticated, thereby enabling devices along the path to operate on one or more of the IP header, the MPLS header, the 802.1Q tag, and/or the Ethernet header as needed.

In order to support IP security using some aspects of IEEE 802.1AE, the IP routers involved in communication of the IP packet—namely, the ingress IP router and egress IP router—may be configured to support various functions for supporting IP encryption using some aspects of IEEE 802.1AE.

In order to support IP security using some aspects of IEEE 802.1AE, the ingress IP router is configured to encrypt a specific IP flow and support authentication for the specific IP flow for routing through a Layer 3 network. The IP flow to which IP security using some aspects of IEEE 802.1AE is to be applied may be configured in various ways, such as by a user, automatically, or the like. The IP flow to which IP security using some aspects of IEEE 802.1AE is to be applied may be identified based on various criteria (e.g., a combination of source IP address and destination IP address, destination IP address only, or the like). The ingress IP router is programmed with the IP flow matching criteria associated with application of IP security (e.g., the software may program the IP flow matching criteria into the hardware, such that the hardware can match packets going through the hardware based on the IP flow matching criteria). The ingress IP router is programmed with the IEEE 802.1AE Secure Association Key (SAK) for encryption (e.g., the hardware is also programmed with the IEEE 802.1AE SAK via 802.1AE procedures). It will be appreciated that each IP flow to be encrypted may be configured to have its own encryption key for use by the IEEE 802.1AE methods.

In order to support IP security using some aspects of IEEE 802.1AE, the ingress IP router may support use of encryption and authentication offsets in order to apply encryption and authentication to the portions of the packet to be encrypted and authenticated, respectively. The encryption and authentication offsets may be specified in various ways (e.g., using start byte/bit location and length, start and end byte/bit locations, or the like). The ingress IP router may support use of programmable and flexible encryption and authentication offsets. The ingress IP router may calculate the encryption and authentication offsets based on the IP address family (e.g., IPv4 or IPv6) of the IP flow (e.g., the software calculates the encryption and authentication offsets). The ingress IP router may determine whether the IP packet is encapsulated over an MPLS tunnel (e.g., IP over MPLS, IP Fast Reroute (FRR) over MPLS for Loop-Free Alternate (LFA) or Topology Independent—LFA (TILFA), or the like) and program the appropriate encryption and authentication offsets for the MPLS tunnel (e.g., a user or the software can indicate if the IP packet is encapsulated over an MPLS tunnel and the software can program appropriate encryption and authentication offsets for the MPLS tunnel into the hardware). The ingress IP router (e.g., hardware and/or software) may be flexible enough and programmable enough to allow programming of any offset for encryption and any offset for authentication, thereby allowing any packet to be encrypted and authenticated at the appropriate offset based on the flow encryption and authentication needs. The ingress IP router, given various network scenarios that may be applied for a given IP flow, may maintain multiple sets of encryption and authentication offsets for the given IP flow in order to support proper application of encryption and authentication to the IP flow for the various network scenarios that may be applied for the given IP flow. For example, the ingress IP router may maintain encryption and authentication offsets as follows: (1) MAC+IP header alone encryption and authentication offset, where the IP flow is going out of an untagged interface, (2) MAC+dot1q vlan tags+IP header encryption and authentication offset, where the IP flow is going out of a dot1q tagged interface, and (3) MAC+MPLS+IP header encryption and authentication offset (e.g., for tunneling or IP FRR over MPLS), where the IP flow has been fast rerouted over an MPLS tunnel or is resolved via an MPLS tunnel. It will be appreciated that encryption and authentication offsets for few or more, as well as different, network scenarios may be maintained by the ingress IP router for various IP flows supported by the ingress IP router.

In order to support IP security using some aspects of IEEE 802.1AE, the encrypted packet is forwarded through an IP network, from the ingress IP router to the egress IP router, with transit IP routers capable of performing various operations on the encrypted packet based on the appropriate OSI Layer header(s) being in the clear. For example, the transit IP routers may remove header fields from the packet (e.g., the MAC header and, optionally, dot1q tags) in order to make a Layer 3 routing decision and then add header fields to the packet (e.g., the MAC header of the next segment and, optionally, dot1q tags) after the Layer 3 routing decision. For example, the transit IP routers can modify one or more fields in the IP header (e.g., decrementing the TTL field, changing the DSCP field based on the QoS configuration of the transit IP router, or the like). For example, the transit IP routers can add or remove MPLS labels for tunneling the IP packet over MPLS or IP FRR over MPLS. For example, the transit IP routers can add or remove dot1q tags depending on the incoming and outgoing port. It will be appreciated that the transit IP routers may be capable of performing these, as well as various other, operations on the encrypted packet based on the IP header, MPLS header, and Ethernet header being unencrypted and unauthenticated.

In order to support IP security using some aspects of IEEE 802.1AE, the egress IP router is configured to decrypt a specific IP flow and support authentication for the specific IP flow for routing through a Layer 3 network. The egress IP router, like the ingress IP router, may be programmed with the appropriate IP flow that needs to be decrypted on the datapath, so the datapath can match the IP flow and initiate decryption procedures using some aspects of IEEE 802.1AE procedures. This programming of the IP flow to be decrypted can be done manually, via signaling, or the like. The egress IP router, upon matching the IP flow when packets of the IP flow are received at the egress IP router, can identify the IP flow as an encrypted flow and decrypt the packets of the IP flow based on the IEEE 802.1AE header and some aspects of IEEE 802.1AE procedures. The egress IP router may then forward the clear text packet based on the forwarding rules of the egress IP router.

It will be appreciated that, although primarily described with respect to example embodiments in which IP flows are encrypted and authenticated using some aspects of IEEE 802.1AE, various example embodiments for supporting IP security using some aspects of IEEE 802.1AE may be applied selectively such that at least some of the IP flows supported by the network may be encrypted and authenticated while at least some of the IP flows supported by the network may not be encrypted and authenticated.

It will be appreciated that various example embodiments for supporting IP security using some aspects of IEEE 802.1AE, by performing encryption and authentication on portions of the packet excluding the IP header any MPLS header which may be present (as opposed to encrypting any byte after the 802.1AE header even if it includes the IP and MPLS headers and running authentication over the entire packet), enable IP capable routers to selectively use the Layer 3 IP header to forward encrypted packets through an IP domain (e.g., between provider edge routers), may enable MPLS capable routers to selectively use the Layer 2.5 MPLS header to forward encrypted packets through an MPLS domain where the IP packet is transported over MPLS, and may enable Ethernet capable devices to selectively use the L2 Ethernet header to forward encrypted packets through an Ethernet domain where the IP packet is transported over Ethernet.

It will be appreciated that various example embodiments for supporting security for communications may be configured to support security for communications of communication protocols operating at Layer 3, using a Layer 2 network security protocol, may be configured to support various other functions for supporting security for communications of communication protocols operating at Layer 3 based on use of the Layer 2 network security protocol.

FIG. 5 depicts an example embodiment of a method for supporting security for communications. It will be appreciated that, although primarily presented herein as being performed serially, at least a portion of the functions of the method 500 may be performed contemporaneously or in a different order than as presented in FIG. 5. At block 501, the method 500 begins. At block 510, support communication of a packet, wherein the packet includes a payload, a header of a first communication protocol at a first communication layer, and a header of a second communication protocol at a second communication layer above the first communication layer, wherein a first portion of the packet, including the payload, is encrypted based on the first communication protocol, wherein a second portion of the packet, including the payload and the header of the first communication protocol, is authenticated based on the first communication protocol, wherein a third portion of the packet, including the header of the second communication protocol, remains unencrypted based on the first communication protocol and unauthenticated based on the first communication protocol. The first portion of the packet, the second portion of the packet, and the third portion of the packet may be identified based on an encryption offset associated with the packet and an authentication offset associated with the packet. The support for communication of the packet may include performing, by an encrypting node, encryption of the first portion of the packet and authentication over the second portion of the packet and sending, by the encrypting node toward a destination node, the packet. The support for communication of the packet may include receiving, by a node, the packet and determining, by the node based on the third portion of the packet, handling of the packet at the node. The support for communication of the packet may include modifying, by the node, at least one aspect of the third portion of the packet to form a modified packet and send, by the node toward a destination node, the modified packet. The support for communication of the packet may include receiving, by a decrypting node, the packet and performing, by the decrypting node, authentication over the second portion of the packet and decryption of the first portion of the packet. The first communication layer may be at Layer 2. The first communication protocol may be a network security protocol configured to support encryption functions and authentication functions. The network security protocol supports features of an IEEE 802.1AE protocol. The second communication layer may be above Layer 2. The second communication layer may be at Layer 2.5 or Layer 3. The second communication protocol may be a Layer 2.5 protocol or a Layer 3 protocol. The second communication protocol may support features of MPLS or support features of IP. The second communication protocol may be a Layer 2.5 protocol. The second communication protocol may support features of MPLS. The header of the second communication protocol may include a set of MPLS labels. The packet may include a header of a third communication protocol at the first communication layer. The header of the third communication protocol may be included in the third portion of the packet. The third communication protocol may support features of Ethernet. The second communication protocol may be a Layer 3 protocol. The second communication protocol may support features of IP. The packet may include a header of a third communication protocol at the first communication layer. The header of the third communication protocol may be included in the third portion of the packet. The third communication protocol may support features of Ethernet. The header of the third communication protocol may include source and destination MAC addresses. The header of the third communication protocol may include at least one Ethernet related tag. The packet may include a header of a third communication protocol at a third communication layer. The third communication layer may be at Layer 2.5. The third communication protocol may be a Layer 2.5 protocol. The third communication protocol may support features of MPLS. The header of the third communication protocol may be included in the third portion of the packet. The packet may include a header of a fourth communication protocol at the first communication layer. The header of the fourth communication protocol may be included in the third portion of the packet. The fourth communication protocol may support features of Ethernet. The header of the fourth communication protocol may include source and destination MAC addresses. The header of the fourth communication protocol includes at least one Ethernet related tag. It will be appreciated that the packet may include various other portions, headers, fields, values, arrangements, or the like, as well as various combinations thereof. At block 599, the method 500 ends. It will be appreciated that support for communication of the packet also may be described as supporting communication of a packet, wherein the packet includes a payload, a header of a first communication protocol at a first communication layer, and a header of a second communication protocol at a second communication layer above the first communication layer, wherein a first portion of the packet, encrypted based on the first communication protocol, includes the payload, wherein a second portion of the packet, authenticated based on the first communication protocol, includes the payload and the header of the first communication protocol, and wherein a third portion of the packet, neither encrypted based on the first communication protocol nor authenticated based on the first communication protocol, includes the header of the second communication protocol.

Various example embodiments for supporting security for communications may provide various advantages or potential advantages. For example, various example embodiments for supporting security for communications may enable support for security for communications of a communication protocol operating above Layer 2, using a Layer 2 network security protocol, in a manner that enables devices along the communication path that operate using the communication protocol above Layer 2 to operate on the header of the communication protocol operating above Layer 2 (e.g., a Layer 2.5 MPLS-capable router can make decisions based on the MPLS header, a Layer 3 IP-capable router can make decisions based on the IP header, and so forth). For example, various example embodiments for supporting security for communications may enable support for security for communications of communication protocols operating above Layer 2, using a Layer 2 network security protocol, in a manner that enables devices along the communication path that operate using the communication protocols above Layer 2 to operate on the headers of the communication protocols operating above Layer 2 without having to first decrypt the packet in order to access the headers of the communication protocols operating above Layer 2 and then re-encrypt the packet before forwarding (e.g., by ensuring that the Layer 2 network security protocol does not apply encryption to the headers of the communication protocols operating above Layer 2). For example, various example embodiments for supporting security for communications may enable support for security for communications of communication protocols operating above Layer 2, using a Layer 2 network security protocol, in a manner that enables devices along the communication path that operate using the communication protocols above Layer 2 to operate on the headers of the communication protocols operating above Layer 2 (e.g., making changes to fields of the headers) without causing a CRC failure and drop of the packet. For example, various example embodiments for supporting security for communications may enable application of IEEE 802.1AE in a manner that makes it suitable for use in end-to-end MPLS tunnel or service encryption/authentication and forwarding, may enable application of IEEE 802.1AE in a manner that makes it suitable for use in end-to-end IP flow encryption/ authentication and forwarding, or the like, as well as various combinations thereof. For example, various example embodiments for supporting security for communications may enable application of IEEE 802.1AE in a manner that enables support for multi-hop Layer 3 encryption with IEEE 802.1AE (e.g., based on leaving the Layer 3 IP header, Layer 2.5 MPLS header, and Layer 2 headers (e.g., the Ethernet MAC header, the 802.1X header, or the like) in the clear), which may be useful in many types of applications such as Generic Routing Encapsulation (GRE) transport tunnels (e.g., where Layer 2 Ethernet Virtual Private Network (EVPN) over Virtual Extensible Local Area Network (VXLAN) or Layer 3 GRE Virtual Private Routed Network (VPRN) can be transporting customer data multi-hop encrypted), transport latency sensitive applications (e.g., Precision Time Protocol (PTP) G.8275.2 where sync information over IP can traverse the network multi-hop), or the like, as well as various combinations thereof. For example, various example embodiments for supporting security for communications may enable application of IEEE 802.1AE to communications of various communication protocols above Layer 2 in a manner that enables various relatively strong attributes of IEEE 802.1AE (e.g., low latency, line rate throughput, suitability for Time Sensitive Networking (TSN), and so forth) to be leveraged while securing the communications of the communication protocols above Layer 2. Various example embodiments for supporting security for communications may provide various other advantages or potential advantages.

Figure 6:
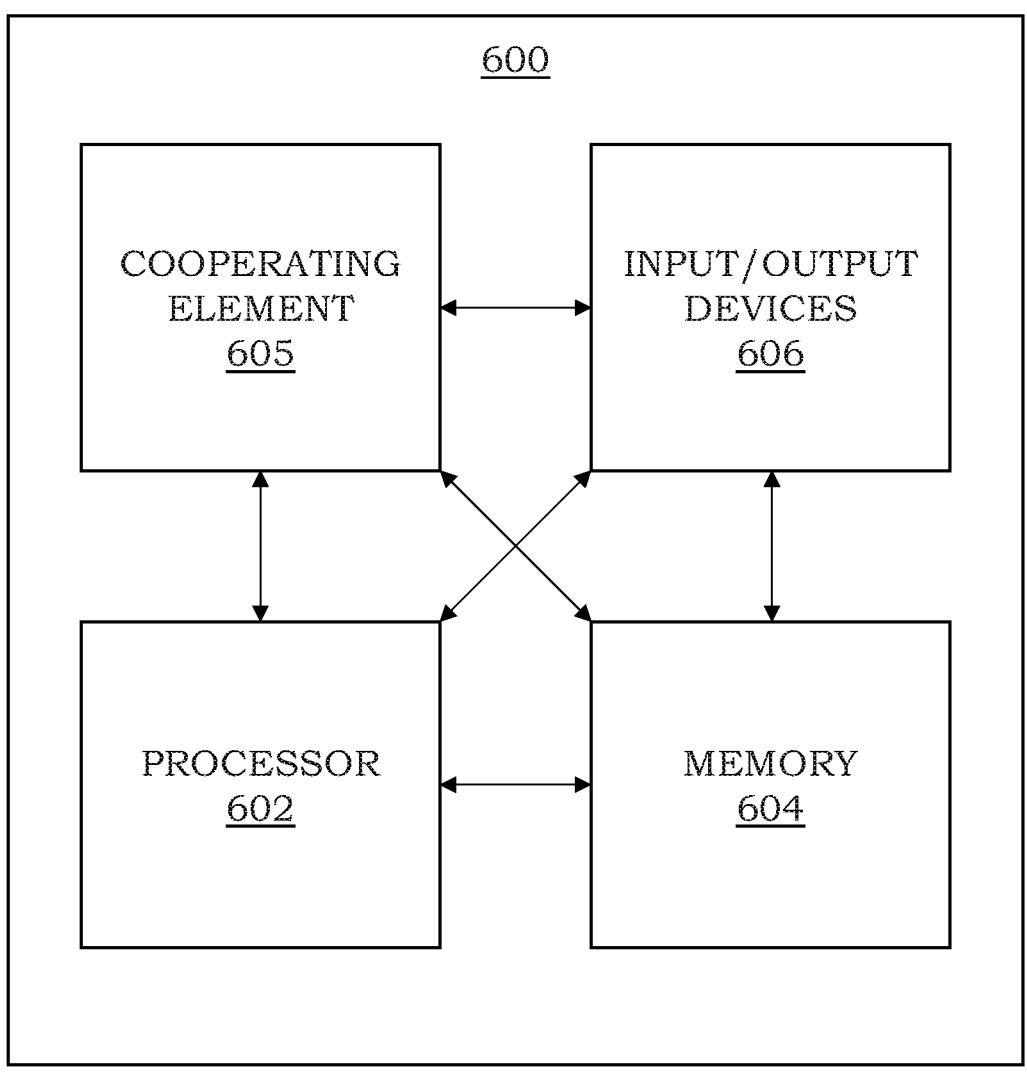
FIG. 6 depicts an example embodiment of a computer suitable for use in performing various functions presented herein.

FIG. 6 depicts an example embodiment of a computer suitable for use in performing various functions presented herein.

The computer 600 includes a processor 602 (e.g., a central processing unit (CPU), a processor, a processor having a set of processor cores, a processor core of a processor, or the like) and a memory 604 (e.g., a random access memory, a read only memory, or the like). The processor 602 and the memory 604 may be communicatively connected. In at least some example embodiments, the computer 600 may include at least one processor and at least one memory including computer product code, wherein the at least one memory and the computer product code are configured, with the at least one processor, to cause the computer 600 to perform various functions presented herein.

The computer 600 also may include a cooperating element 605. The cooperating element 605 may be a hardware device. The cooperating element 605 may be a process that can be loaded into the memory 604 and executed by the processor 602 to implement various functions presented herein (in which case, for example, the cooperating element 605 (including associated data structures) can be stored on a non-transitory computer-readable storage medium, such as a storage device or other suitable type of storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a compact disk drive, a hard disk drive, a solid state drive, or the like), or the like, as well as various combinations thereof.

It will be appreciated that computer 600 may represent a general architecture and functionality suitable for implementing functional elements described herein, portions of functional elements described herein, or the like, as well as various combinations thereof. For example, computer 600 may provide a general architecture and functionality that is suitable for implementing one or more elements presented herein, such as a communication device 110, a portion of a communication device 110, a communication security element 111, a portion of a communication security element 111, or the like, as well as various combinations thereof.

Key Distribution

IEEE 802.1AE was originally designed for Layer 2 encryption only. The techniques described above—referred to below as ANYSec—enable some aspects of IEEE 802.1AE to be used for encrypting Layer 2.5 MPLS networks and Layer 3 IP networks.

As described above, in order to support IP/MPLS security using some aspects of IEEE 802.1AE, a transmitting (TX) node (e.g., an ingress IP/MPLS router) is configured with a Secure Association Key (SAK) used to encrypt a specific IP/MPLS flow and support authentication for the specific IP flow for routing through a Layer 3/2.5 network from the TX node to a receiving (RX) node (e.g., an egress IP/MPLS router). In order for the RX node to decrypt the IP/MPLS flow, the RX node must have the same SAK that the TX node used to encrypt the IP/MPLS flow.

IEEE 802.1AE suggests the use of MACsec (Media Access Control Security) Key Agreement (MKA) described in IEEE 802.1x 2010 for key distribution between nodes. MKA comprises a secure, fully distributed, point-to-point or multipoint-to-multipoint transport and a number of applications of that transport, including the distribution of Security Association Keys by an elected key server using Advanced Encryption Standard (AES) Key Wrap, such as Cipher-based Message Authentication Code (CMAC)-AES-128, CMAC-AES-256, or the like. MKA uses the Layer 2 Extensible Authentication Protocol Over LAN (EAPoL) protocol as its transport. Unfortunately, MKA transport over a Layer 2 header will not be usable in an MPLS/IP network. This disclosure provides transport of a SAK from a TX node to an RX node over Internet Protocol (IP) and User Datagram Protocol (UDP) to satisfy ANYSec needs.

In addition, this disclosure details how an encryption flow and its corresponding SAK can be identified via a Security Channel Identifier (SCI) in case of ANYSec. In MACsec, the SCI is built from the MAC address and the VLAN that is being encrypted. For ANYSec and MPLS/IP encryption, the SCI uniquely identifies the MPLS Link State Protocol (LSP) Tunnel or the IP flow. The SCI comprises an encryption segment identifier (SID) to identify the encrypting TX node and a unique identifier of the tunnel on the encrypting TX node. The SCI can be used on the RX node to (i) uniquely identify the encrypting TX node and the TX node flow and (ii) determine the appropriate SAK to use to decrypt the encrypted flow received from the TX node.

Section 9 of IEEE 802.1x-2010 explains the MACsec Key Agreement (MKA) Protocol in detail. Section 9.4, last paragraph, points out that MKA is designed for mutual authentication of participants in a Connectivity Association (CA), and can be used for any application. As such, since ANYSec uses some aspects of IEEE 802.1AE to encrypt IP and MPLS flows, MKA is used to authenticate ANYSec peers. One shortfall of MKA is how it identifies an SCI in a datapath and the fact that the SCI is transported as a EAPOL packet (i.e., Layer L2 header only).

Section 9 also points out that:

MKA allows nodes to discover and authenticate each other via the CA Key (CAK), and agree on the secret Security Association Keys to be used to encrypt communications;

MKA protects the distributed Security Association Keys via Advanced Encryption Standard (AES) Key wrap;

Security Association Keys are created by the key server that is negotiated via MKA;

MKA manages the installation and use of the Security Association Keys by the MAC Security Entities (SecYs) that secure the data transmitted and received. Each SecY uses MKA to communicate the lowest packet number (PN) used for transmission with the SAK within the last two seconds, allowing receivers to bound transmission delays;

The system that implements MKA satisfies (i) random number generation and (ii) SCI, which is a unique MAC address and Port ID within the system for MACsec implementation. (In ANYSec, SCI can be changed to the node chassis MAC and Encryption Segment to comprise a globally unique identifier);

The root of key hierarchy for any given instance of MKA is the secure CAK key. Each CAK key is identified by a CA Key Name (CKN) that allows each of the MKA participants to select which CAK key to use to process a received MKA packet.

Most of above criteria for MACsec are also useful for ANYSec to encrypt MPLS or IP flows, as long as (i) MKA can be transported over IP and (ii) the SCI is changed to uniquely identify the encryption flow via a new identifier as discussed previously.

EAP Over IP

To solve the MPLS/IP flow encryption problem of using MKA for ANYSec, the MKA signaling, and key distribution should be over IP, in other words, using Extensible Authentication Protocol over IP (EAPoIP). In that case, IP will route an MKA packet from the originating TX node to the destination RX node of an ANYSec flow. The destination node needs to identify the packet as an MKA packet in order to process the MKA packet. To identify the Protocol Data Unit (PDU) as a unique MKA PDU in the network, UDP and a specific UDP port assigned to MKA are used. This UDP port may be configured or it might be a well-known UDP port assigned by the Internet Assigned Numbers Authority (IANA).

UDP is ideal for this MKA identification, as it is a best-effort protocol and does not have a retransmission mechanism in case of lost packets, as Transmission Control Protocol (TCP) does. This is ideal for MKA, where MKA packets are transmitted periodically (based on a configured timer). If a few MKA packets are lost, then the receiving side of MKA will take the MKA session down. This periodic packet transmission is known as a heartbeat.

EAP Packet

FIG. 7 depicts an example embodiment of a packet format for illustrating a new MKA packet 700 transported via EAPOL and how MKA (i.e., EAP over IP/UDP) looks. As shown in FIG. 7, MKA packet 700 includes Layer 2 header 702, IP header 704, UDP header 706, IEEE 802.1x header 708, and MKA payload 710. A conventional MKA packet includes a Layer 2 header, an IEEE 802.1x header, and an MKA payload that are respectively analogous to the Layer 2 header 702, the IEEE 802.1x header 708, and the MKA payload 710 of FIG. 7. The new MKA packet 700 adds the IP header 704 and the UDP header 706 to enable the MKA packet 700 to be transmitted over IP/UDP at Layer 3. This Layer 3 MKA can be used for signaling appropriate Security Association Keys for MPLS encryption via some aspects of IEEE 802.1AE and IP encryption via some aspects of IEEE 802.1AE. The MKA packet 700, which is transmitted over IP/UDP, can be used to distribute a SAK that can be used for encryption of Layer 2.5 (MPLS) and/or Layer 3 (IP) packets.

With EAP over IP/UDP, a configurable UDP port can be used to identify the MKA application throughout the network. This UDP port can be configurable via a Command Line Interface (CLI) or any other suitable means. MKA packet 700 is generated with UDP header 706, where the destination UDP port identified in the UDP header 706 is set to this configured UDP port. An MKA packet 700 arriving at the destination RX node to this destination UDP port will be identified and processed by the node, as an example processed via conventional MKA code the same as any other MKA packet (i.e., EAPOL). The source UDP port identified in the UPD header 706 can be randomly allocated. It should be noted that this destination UDP port can be a well-known port assigned by IANA (Internet Assigned Number Authority) in the future.

The source IP address identified in the IP header 704 should be the IP address of the node that generated the MKA packet 700. As an example in case of MPLS and segment routing (SR), the source IP address is the IP address that the SR label is being advertised for or the IP address that the MPLS label is binded to. The destination IP address identified in the IP header 704 should be the IP address residing on the node that the LSP (MPLS Tunnel) is terminating to. As explained before, when the MKA packet 700 arrives to this destination IP address and the RX node examines the destination UDP port and identifies the port to be assigned to the MKA process, the RX node will process the packet as MKA to obtain the SAK.

As mentioned previously, in MACsec, the secure channel identifier (SCI) is used when there are multiple flows (e.g., VLANs) encrypted on a single port. Each VLAN needs to be identified uniquely to ensure that the correct SAK is used to encrypt and decrypt the flow. In MACSec, the SCI is built of the port MAC and the VLAN ID.

Note that the SCI is optional and is needed only when there are multiple flows on the same port, since each flow needs to be encrypted with a different key and a Security Channel Identifier (SCI) for that key.

The SCI and its corresponding SAK are signaled via MKA between the nodes, as an example, the encrypting node and the decrypting node. With the same token, the SCI and its corresponding SAK are installed in the datapath on both nodes. The encrypting node uses the SAK to encrypt packets, where each encrypted packet has an IEEE 802.1AE header containing the SCI. When an encrypted packet arrives at the decrypting node, the decrypting node reads the SCI in the IEEE 802.1AE header and uses the SCI to identify and apply the corresponding SAK to decrypt the encrypted packet.

In ANYSec, the port MAC address or VLAN cannot be used to identify the flow since the flow is MPLS or IP. ANYSec uses an encryption segment identifier (SID) to identify the encrypting node uniquely within the network. As such, this encryption SID can also uniquely identify the encrypting node in the SCI. There can be many different MPLS flows that need to be encrypted within this TX node. As such, a second Identifier is used to uniquely identify the flow within the node. As an example, this second identifier can be the tunnel ID or another unique identifier for that tunnel or IP flow. To ensure that the SCI does not collide with any other MAC address for MPLS or IP, the SCI can start with an invalid byte like which is a multicast MAC and would never be used by MACsec.

In general, for MPLS and IP security via MKA and some aspects of IEEE 802.1AE, SCI has to uniquely identify the MPLS or IP flow to be secured and the node that is doing the securing of the tunnel.

In one possible implementation, the 8-byte SCI has the following format:

[01 RR RR RX XX XX YY YY], where each character represents a 4-bit nibble, [RRRRR] are 20 reserved bits, [XXXXX] is the 20-bit local Ethernet Segment (ES) label, and [YYYY] is the 16-bit unique ID per encryption flow, e.g., locally generated on the encrypting TX node. This is another reason why the encryption SID needs to uniquely identify per node or per encryption group.

Although embodiments of the present disclosure have been described in the context of SAK distribution using MKA packets over Layer 2.5 MPLS transport or Layer 3 IP transport, the disclosure is not so limited. In general, the present disclosure can be implemented for the distribution of any encryption key using MKA packets over any Layer 2.5/3 transport identified via a UPD port.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions. It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A transmitting (TX) node, comprising:
at least one processor; and
at least one memory including computer program code;
wherein the at least one memory and the computer program code are configured to, with the at least one processor, cause the TX node to at least:
generate an MKA (MACsec (Media Access Control Security) Key Agreement) packet comprising a Layer 2 header, an Internet Protocol (IP) header, a User Datagram Protocol (UDP) header, an IEEE 802.1x header, and an MKA payload containing an encryption key for encrypting a packet flow transmitted from the TX node to a receiving (RX) node; and
transmit the MKA packet to the RX node via a Layer 3 transport, wherein:
the IEEE 802.1x header comprises a Security Channel Identification (SCI) that uniquely identifies the packet flow and the encrypting TX node; and
the SCI comprises an encryption segment identifier (SID) to identify the encrypting TX node and a unique identifier of a tunnel on the encrypting TX node.

2. The TX node of claim 1, wherein the encryption key is a Secure Association Key (SAK).

3. The TX node of claim 1, wherein the TX node is configured to receive the SAK from a key server using Advanced Encryption Standard (AES) Key Wrap.

4. The TX node of claim 1, wherein the TX node is configured to encrypt the encryption key in the MKA packet using AES Key Wrap.

5. The TX node of claim 1, wherein the TX node is configured to:
generate the unique identifier locally; and
transmit the SCI to the RX node using MKA over IP/UDP header.

6. The TX node of claim 1, wherein the TX node is configured to:
use the encryption key to encrypt packets of the packet flow; and
transmit the encrypted packets to the RX node via Layer 2.5/3 transport.

7. The TX node of claim 6, wherein the Layer 2.5/3 transport is a Layer 2.5 Multiprotocol Label Switching (MPLS) transport.

8. The TX node of claim 6, wherein the Layer 2.5/3 transport is a Layer 3 Internet Protocol (IP) transport.

9. The TX node of claim 1, wherein the Layer 3 transport is IP transport.

10. A receiving (RX) node, comprising:
at least one processor; and
at least one memory including computer program code;
wherein the at least one memory and the computer program code are configured to, with the at least one processor, cause the RX node to at least:
receive, from a transmitting (TX) node via a Layer 3 transport, an MKA packet comprising a Layer 2 header, an IP header, a UDP header, an IEEE 802.1x header, and an MKA payload containing an encryption key for decrypting a packet flow transmitted from the TX node to the RX node; and
process the MKA packet to obtain the encryption key, wherein:
the IEEE 802.1x header comprises an SCI that uniquely identifies the packet flow and the encrypting TX node; and
the SCI comprises an encryption SID to identify the encrypting TX node and a unique identifier of a tunnel on the encrypting TX node.

11. The RX node of claim 10, wherein the encryption key is a SAK.

12. The RX node of claim 10, wherein the encryption key is encrypted in the MKA packet using AES Key wrap.

13. The RX node of claim 10, wherein the RX node is configured to receive the SCI from the TX node using MKA over IP/UDP header.

14. The RX node of claim 10, wherein the RX node is configured to:
receive encrypted packets of the packet flow from the TX node via the Layer 2.5/3 transport; and
use the encryption key to decrypt the encrypted packets.

15. The RX node of claim 14, wherein the Layer 2.5/3 transport is a Layer 2.5 MPLS transport.

16. The RX node of claim 14, wherein the Layer 2.5/3 transport is a Layer 3 IP transport.

17. The RX node of claim 10, wherein the Layer 3 transport is IP transport.

18. A method comprising:
a TX node generating an MKA packet comprising a Layer 2 header, an IP header, a UDP header, an IEEE 802.1x header, and an MKA payload containing an encryption key for encrypting a packet flow transmitted from the TX node to an RX node; and
the TX node transmitting the MKA packet to the RX node via a Layer 3 transport, wherein:

the IEEE 802.1x header comprises an SCI that uniquely identifies the packet flow and the encrypting TX node; and the SCI comprises an encryption SID to identify the encrypting TX node and a unique identifier of a tunnel on the encrypting TX node.

19. A method comprising:

an RX node receiving, from a TX node via a Layer 3 transport, an MKA packet comprising a Layer 2 header, an IP header, a UDP header, an IEEE 802.1x header, and an MKA payload containing an encryption key for decrypting a packet flow transmitted from the TX node to the RX node; and the RX node processing the MKA packet to obtain the encryption key, wherein:

the IEEE 802.1x header comprises an SCI that uniquely identifies the packet flow and the encrypting TX node; and the SCI comprises an encryption SID to identify the encrypting TX node and a unique identifier of a tunnel on the encrypting TX node.

\* \* \* \* \*